United States Patent
Shitomi et al.

(10) Patent No.: US 7,966,517 B2
(45) Date of Patent: Jun. 21, 2011

(54) METHOD AND APPARATUS FOR VIRTUAL NETWORK ATTACHED STORAGE REMOTE MIGRATION

(75) Inventors: Hidehisa Shitomi, Mountain View, CA (US); Takashi Oeda, Los Altos, CA (US)

(73) Assignee: Hitachi, Ltd., Tokyo (JP)

( * ) Notice: Subject to any disclaimer, the term of this patent is extended or adjusted under 35 U.S.C. 154(b) by 590 days.

(21) Appl. No.: 12/052,665

(22) Filed: Mar. 20, 2008

(65) Prior Publication Data

US 2009/0240975 A1    Sep. 24, 2009

(51) Int. Cl.
*G06F 11/00* (2006.01)
(52) U.S. Cl. .................................. 714/5; 714/3
(58) Field of Classification Search .......... 714/5, 3, 714/4, 8, 42, 54
See application file for complete search history.

(56) References Cited

U.S. PATENT DOCUMENTS

| | | | |
|---|---|---|---|
| 7,136,855 B2 * | 11/2006 | Saika | 726/2 |
| 7,200,622 B2 | 4/2007 | Nakatani et al. | |
| 2004/0143608 A1 | 7/2004 | Nakano et al. | |
| 2007/0073782 A1 * | 3/2007 | Nakatani et al. | 707/200 |
| 2007/0150690 A1 * | 6/2007 | Chen et al. | 711/170 |
| 2008/0010485 A1 * | 1/2008 | Shitomi et al. | 714/3 |

* cited by examiner

*Primary Examiner* — Dieu-Minh Le
(74) *Attorney, Agent, or Firm* — Sughrue Mion, PLLC

(57) ABSTRACT

A system and a method for causing migration of VNASs formed on NAS heads of one NAS system to other NAS heads on the same NAS system or on other NAS systems including independent storage systems. A VNAS management program on each NAS head includes a VNAS assign program, a failure detect program and a load balance program, that all include a capability for causing remote migration of VNASs on the NAS head in case a VNAS fails, the NAS head fails, or the entire NAS system fails. The VNAS management capability may cause VNAS migration if a NAS head is over loaded or if it is lightly loaded and may be powered down after its VNASs have been transferred.

20 Claims, 20 Drawing Sheets

Fig. 3A
Mount Table 2126

| File System ID | Inode | Mount Point | Parent File System ID | Parent Inode | Device Name |
|---|---|---|---|---|---|
| Fs0 | 2 | / | - | - | Dev0 |
| Fs1 | 200 | /export/fs1 | Fs0 | 20 | Dev1 |
| Fs2 | 500 | /export/fs2 | Fs0 | 30 | Dev2 |

Fig. 3B
Device Table 2127

| Device Name | Device ID |
|---|---|
| Dev0 | 2401 |
| Dev1 | 2402 |
| Dev2 | 2403 |

Fig. 3C
Routing Table 2128

| Destination | Gateway | mask | Network Interface |
|---|---|---|---|
| 192.168.1.0 | - | 255.255.255.0 | Eth0 |
| 192.168.2.0 | - | 255.255.255.0 | Eth1 |
| default | 192.168.1.1 | 0.0.0.0 | Eth0 |

Fig. 3D
VNAS Management Table 2117

| NAS Head | VNAS | LUs |
|---|---|---|
| 2100 | 2120 | 2401 |
|  |  | 2402 |
|  | 2130 | 2403 |
|  |  | 2404 |
| 2101 | 2121 | 2405 |
|  |  | 2406 |

Fig. 3E
VNAS Copy Table 1113

| Source NAS Head | Source VNAS | Source storage system | Source LU | Target storage system | Target LU |
|---|---|---|---|---|---|
| 2100 | 2120 | 2200 | 2401 | 3200 | 3401 |
|  |  | 2200 | 2402 | 3200 | 3403 |
|  | 2130 | 2200 | 2403 | 3200 | 3403 |
|  |  | 2200 | 2404 | 3200 | 3404 |
| 2101 | 2121 | 2200 | 2405 | 3200 | 3405 |
|  |  | 2200 | 2406 | 3200 | 3406 |

METHOD AND APPARATUS FOR VIRTUAL NETWORK ATTACHED STORAGE REMOTE MIGRATION

FIELD OF THE INVENTION

The present invention relates generally to computer storage systems and, more particularly, to network attached storage (NAS) and virtual network attached storage (VNAS).

DESCRIPTION OF THE RELATED ART

NAS is a file-level computer data storage that is coupled to a computer network for providing data access to heterogeneous network clients. NAS hardware is similar to the traditional file server equipped with direct attached storage. However on the software side, the operating system and other software on the NAS unit focuses on the file serving such as the functionality of data storage and data access and the management of these functionalities. NAS systems usually contain one or more hard disks, often arranged into logical, redundant storage containers or redundant arrays of independent disks (RAIDs), as do traditional file servers. NAS provides both storage and filesystem and removes the responsibility of file serving from other servers on the network. This is often contrasted with storage area network (SAN), which provides only block-based storage and leaves filesystem concerns on the client side. Examples of SAN protocols include SCSI, Fibre Channel, iSCSI, ATA over Ethernet, or Hyper-SCSI.

The boundaries between NAS and SAN systems are also starting to overlap, with some products making the obvious next evolution and offering both file level protocols (NAS) and block level protocols (SAN) from the same system.

A NAS head refers to a NAS which does not have any on-board storage, but instead connects to a SAN. In effect, it acts as a translator between the file-level NAS protocols, such as NFS and CIFS, and the block-level SAN protocols, such as, Fibre Channel and iSCSI. Thus it can combine the advantages of both technologies. The term NAS head is also used to refer to the portion of a self-contained NAS system other than its storage.

VNAS is a logically separated space of a NAS head, and provides NAS functionalities to NAS clients. Multiple VNASs can be located on a single NAS head. From the NAS client point of view, a VNAS can be seen as an individual NAS System. The VNAS has its own logical units (LUs), logical volume management (LVM), root file system, IP addresses, user name space, and process space. VNAS is typically used when file servers or NASs are consolidated into large NAS systems. Two uses of VNAS include: (1) when file servers or NASs for several departments are consolidated into large NAS systems in an enterprise, each VNAS can represent file servers or NASs of one department; and (2) a service provider can separate a NAS system into VNASs for each client of the service provider.

Each VNAS can be moved between NAS heads of a NAS system. Because NAS heads of a NAS system share a storage system, the moved VNAS can be seen as the same LUs, for example OS LU and user data LU, and there is no need for data migration in response to the VNAS migration.

VNAS migration may be desirable to ensure high availability or for load balancing. However, previously disclosed methods do not allow moving a VNAS from one NAS system to a different NAS system.

SUMMARY OF THE INVENTION

The inventive methodology is directed to methods and systems that substantially obviate one or more of the above and other problems associated with conventional techniques for VNAS migration.

Aspects of the present invention provide a method and an apparatus for remote VNAS migration. VNASs can migrate from one NAS system to a remote NAS system to ensure high availability, for load balancing, or for disaster recovery. In order to realize the aspects of the present invention, data copy between a first storage system and a second storage system is needed. Further, in order to implement the remote copying features of the present invention, a VNAS management program at the NAS head is extended to include a remote capability, and a VNAS copy management program is included at the management software of a management computer.

In accordance with one aspect of the inventive concept, there is provided a computer-implemented method for VNAS migration in case of a virtual network attached storage (VNAS) failure at a first VNAS located at a source network attached storage (NAS)-head. The inventive method involves: detecting a failure of the first VNAS; selecting a target NAS head by referring to load information of multiple NAS heads being managed by a load balancing module at the source NAS head; and moving the first VNAS from the source NAS head to the target NAS head. The source NAS head and the target NAS head are located on different NAS systems.

In accordance with another aspect of the inventive concept, there is provided a computer-implemented method for virtual network attached storage (VNAS) migration in case of failure of a source network attached storage (NAS) head including a multiple source VNAS. The inventive method involves: detecting a failure of the source NAS head; selecting one or more target NAS heads by referring to load information of NAS heads being managed by a common program; and moving the plurality of source VNAS from the source NAS head to the target NAS heads. The source NAS head is located on a first NAS system and the target NAS heads are located on one or more NAS systems different from the first NAS system.

In accordance with yet another aspect of the inventive concept, there is provided a computer-implemented method for virtual network attached storage (VNAS) migration from a source network attached storage (NAS) head hosting multiple source VNAS. The inventive method involves detecting overloading or light loading or failure at the source NAS head; selecting one or more target NAS heads by referring to load information of NAS heads being managed by a common program as the source NAS head; and moving one or more of the plurality of source VNASs from the source NAS head to the target NAS heads. The source NAS head is located on a first NAS system and the target NAS heads are located on one or more NAS systems different from the first NAS system.

In accordance with a further aspect of the inventive concept, there is provided a system for implementing remote virtual network attached storage (VNAS) migration. The inventive system incorporates one or more network attached storage (NAS) systems; one or more management computers; and one or more networks for coupling the NAS systems together and to the one or management computers. Each of the NAS systems includes one or more NAS heads, each of the NAS heads being logically divided into one or more VNAS. The NAS systems further include a storage system coupled to the one or more NAS heads, the storage system having a storage controller coupled to disk drives. The one or more VNAS are configured to migrate from one NAS system to another NAS system.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 3A shows a mount table correlating file systems and device names with mount points according to aspects of the invention.

FIG. 3B shows a device table correlating device names and device IDs according to aspects of the invention.

FIG. 3C shows a routing table correlating the destination and gateway with the network interface being used according to aspects of the invention.

FIG. 3D shows a VNAS management system showing the LUs associated with each VNAS and the VNASs associated with each NAS head according to aspects of the invention.

FIG. 3E shows a VNAS copy table including the source and target storage systems and LU numbers for each source VNAS on a source NAS head according to aspects of the invention.

DETAILED DESCRIPTION

Figure 1A:
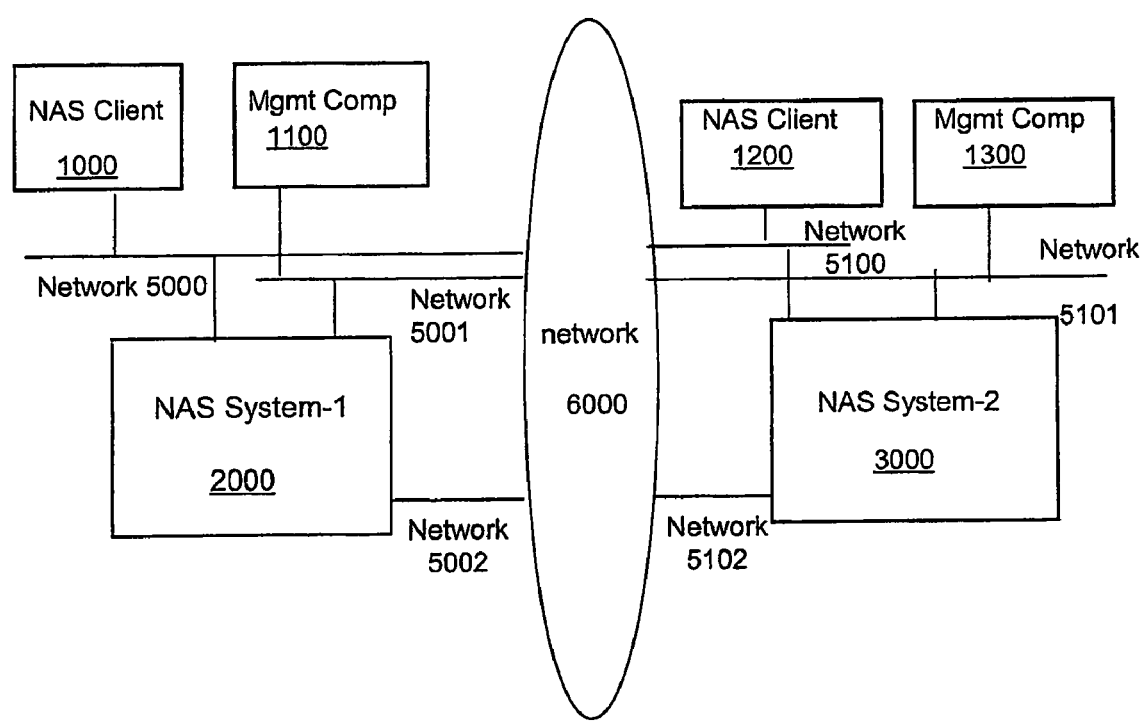
FIG. 1A shows an exemplary hardware configuration for implementing a method and an apparatus according to aspects of the present invention.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provide a method and an apparatus for remote VNAS migration. According to the aspects of the invention, a VNAS can move from a primary NAS head, also called a source NAS head, to a NAS head which does not share the storage system of the primary NAS head, i.e. to another NAS system. This is referred to as remote VNAS migration.

High availability and load balancing are improved by remote VNAS migration. Further, disaster recovery may be achieved by remote VNAS migration.

To ensure high availability, when a VNAS failure such as VNAS software failure happens, a new VNAS is created, or in other words "moved," on the same NAS head or on another NAS head. In case of NAS head failure, all VNASs on the failed head are moved to other NAS heads.

To achieve load balancing, when a NAS head is over loaded, VNASs are moved to other NAS heads for load balancing. Further, to achieve load balancing when a NAS head is lightly loaded, for example at night time, VNASs of the lightly loaded NAS head could be moved to other NAS heads, and the primary NAS head could be turned down for power saving.

In the case of an unforeseen failure, such as a natural disaster, when a first site is disabled, the secondary site may take over the task of the first site. According to aspects of the present invention, the NAS heads on the secondary site do not have to be standby, which means active/active configuration is possible in order to increase the utilization. Moreover, unlike the NAS system level disaster recovery where the secondary site is substantially identical to the primary site, the number of NAS heads on the secondary site might be reduced.

This is possible because more VNASs may run on each one of the remote NAS heads than on each NAS head at the primary site.

Aspects of the present invention extend the migration range from within a single NAS system to migration to other NAS systems. The second NAS system can be located at the same site as the first NAS system. However, if disaster recovery is a concern, the second NAS system may be located at a different site.

FIG. 1A shows an exemplary hardware configuration for implementing a method and an apparatus according to aspects of the present invention.

The system of FIG. 1A includes a NAS system at a first site that is coupled through a network to another NAS system at a second site. The first site may be referred to as the source site or the primary site and the second site may be referred to as the remote site or the target site. At the primary site, the system includes a NAS client 1000, a management computer 1100 and a first NAS system-1 2000. A second system may be configured with similar components at the target site. The target system is shown to include a NAS client 1200, a management computer 1300, and a second NAS system-2 3000. In other aspects of the invention, more than two NAS systems may be used and coupled together through a network. Further, each side may include more or fewer NAS clients.

On the first side, a network 5000 couples the NAS clients 1000 to the NAS system-1 2000 and another network 5001 couples the management computer 1100 to the NAS system-1 2000. On the second side, a network 5100 couples the NAS clients to the second NAS system-2 3000 and another network 5101 couples the management computer 1300 to the second NAS system-2 3000.

The networks on each side are coupled together through a network 6000 that may be a wide area network (WAN) when the second system is located at a different location. If the target system is not located at a different location, a different type of network such as a local area network (LAN) may be used to implement the network 6000. Each side is shown to include a third network 5002, for the first side, and 5102, for the second side, that couple the NAS systems 2000, 3000 together through the network 6000. The networks depicted are exemplary and equivalent arrangements may be used. Further, in some arrangements, not all of the networks shown are necessary and some may be omitted.

For balancing the load between the different NAS systems, the second system can be located at the same location as the first system or at a different location. For disaster recovery purposes, the second system is located at a different location to remain protected in case the first location is damaged.

Figure 1B:
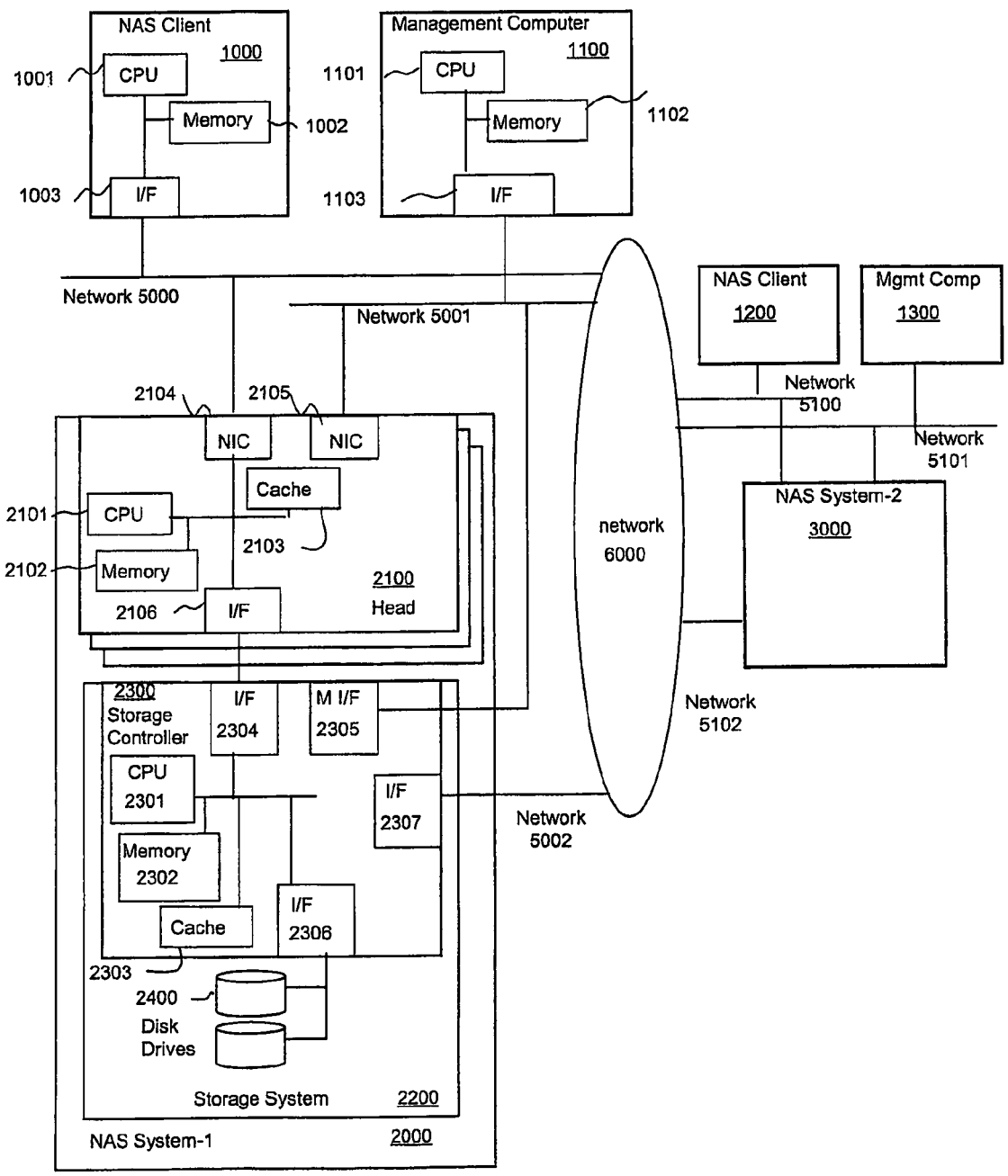
FIG. 1B shows an exemplary hardware configuration for components of FIG. 1A.

FIG. 1B shows an exemplary hardware configuration for components of FIG. 1A.

Each of the NAS client computers 1000, 1200 and each of the management computers 1100, 1300 include a CPU, a memory and a network interface. The NAS client 1000 using the network interface (I/F) 1003 is coupled to the NAS system-1 2000 via the network 5000. The management computer 1100 using the network interface (I/F) 1103 is coupled to the NAS system-1 2000 via the network 5001.

Each of the NAS systems 2000, 3000 may be divided into two parts, a head 2100 and a storage system 2200. The head 2100 and the storage system 2200 may be coupled via an interface 2106 at the head and an interface 2304 at the storage system. The head 2100 and the storage system 2200 can exist in one storage unit, called a Filer. In that case, the two elements are coupled via a system bus such as PCI-X. Moreover, the head can include internal disk drives without connecting to any storage system, which is similar to a general purpose server. On the other hand, the head and the storage system can be physically separated. In that case, the two elements are coupled via network connections such as Fibre Channel or Ethernet. Various hardware implementations may be used to implement the embodiments of the invention. NAS systems can also be configured by a multinode cluster, which means that a group of heads, including the head 2100, configure a cluster. FIG. 1B shows a group of heads with the head 2100 on top and the other heads stacked under the head 2100. Using a cluster configuration does not affect implementation of the embodiments of the invention.

The head 2100 comprises a CPU 2101, a memory 2102, a cache 2103, a frontend network interface (NIC) 2104, a management NIC 2105, and a disk interface (I/F) 2106. The NICs 2104 and 2105 can be either physically separate or logically separate. The head 2100 processes requests from the NAS clients 1000 and the management computer 1100.

The program used to process the network file system (NFS) requests or to perform other operations is stored in the memory 2102 and is executed by the CPU 2101. The cache 2103 stores NFS write data from the NFS clients 1000 temporarily before the data is forwarded into the storage system 2200, or stores NFS read data that are requested by the NFS clients 1000. The cache memory 2103 may be a battery backed-up non-volatile memory. In another implementation, the memory 2102 and the cache memory 2103 may be combined within a same memory.

The frontend NIC 2104 is used to couple the NAS clients 1000 and the head 2100. The management NIC 2105 is used to couple the management computer 1100 and the head 2100. Ethernet is one exemplary implementation for providing such connections and may be used to implement the NIC 2104 or the NIC 2105. The disk interface 2106 is used to couple the head 2100 and the storage system 2200. Fibre Channel (FC) and Ethernet are exemplary implementations for providing the disk interface 2106 connection. In the case of internal connection between the head and the controller, i.e. in the case of a single storage unit implementation, system bus is an exemplary implementation of the connection.

The storage system 2200 includes a storage controller 2300 and disk drives 2400. The storage controller 2300 comprises a CPU 2301, a memory 2302, a cache memory 2303, a frontend interface (I/F) 2304, a management interface (M I/F) 2305, a disk interface (I/F) 2306, and a remote copy interface (I/F) 2307.

The storage controller 2300 is coupled to the head 2100 and processes I/O requests from the head 2100. The program for processing the I/O requests or other operations is stored in the memory 2302 and is executed by the CPU 2301.

The cache memory 2303 stores the write data from the head 2100 temporarily before the data is stored into the disk drives 2400, or stores the read data that are requested by the head 2100. The cache memory 2303 may be a battery backed-up non-volatile memory. In another implementation, the memory 2302 and the cache memory 2303 are combined within a same memory.

The host interface 2304 is used to couple the head 2100 and the storage controller 2300. Fibre channel and Ethernet may be used for implementing the connection. A system bus connection such as PCI-X may also be used. The management interface (M I/F) 2305 is used to couple the management computer 1100 and the storage controller 2300. Ethernet is an exemplary implementation of this connection. The Disk interface (I/F) 2306 is used to connect the disk drives 2400 and the storage controller 2300. The remote copy interface 2307 is used to couple the storage controller 2300 to the remote storage system in order to copy data. Fibre Channel is an exemplary implementation of the connection. When the remote storage system is located at a different site, the connection extends over a WAN.

Each of the disk drives 2400 processes the I/O requests in accordance with disk device commands such as SCSI commands. The management computer 1100 using the network interface (I/F) 1103 is coupled to the head 2100 and the storage system 2200 via the network 5001.

FIGS. 1A and 1B also show the networks 5000, 5001, 5002, 5100, 5101, 5102, 6000. The networks 5000, 5001, 5100 and 5101 can be either physically separate networks or logically separate networks by utilizing network partitioning technology such as VLAN. The networks 5000, 5001, 5100 and 5101 are coupled together. The connection can be over a network 6000. One exemplary media for implementation of the networks 5000, 5001, 5100 and 5101 is Ethernet and IP protocol may be used to implement the network 6000 when it is a WAN. The networks 5002 and 5102 are coupled together through the network 6000, and are used for remote copying between storage systems. One exemplary implementation of the network is Fibre Channel. Dedicated dark fiber or SDH/SONET are examples of implementation of the underlying network technology of the network 6000 when this network is a WAN. The networks 5002 and 5102 provide an option for remote copying, i.e. block storage based remote replication. Another option for remote copying is to use the network 5000 and 5100 to obtain NAS based remote replication. Both options can be employed in different embodiments of the invention. Other appropriate hardware architecture may also be used for implementing the embodiments of the invention.

Figure 2:
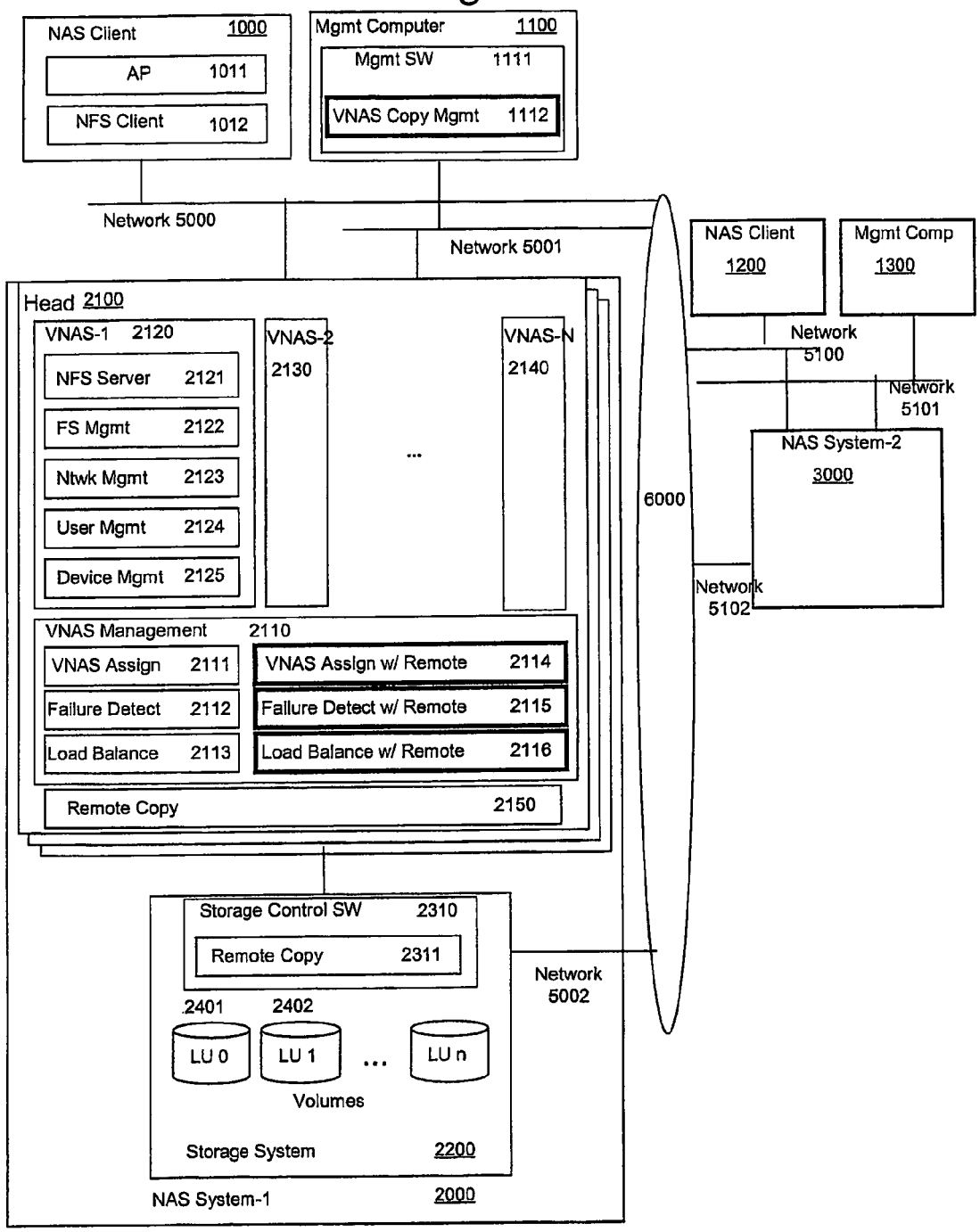
FIG. 2 shows an exemplary software configuration for implementing components of FIG. 1B.

FIG. 2 shows an exemplary software configuration for implementing a method and an apparatus according to aspects of the invention.

The system shown in FIG. 2 includes the NAS clients 1000, 1200, the management computers 1100, 1300, and the NAS systems 2000, 3000.

At the NAS client 1000, 1200 NAS client applications (AP) and general NFS client software are running on the CPU 1001. The client application (AP) 1011 generates file manipulation operations. The NFS client program 1012, such as NFSv2, v3, v4, or CIFS, communicates with an NFS server program 2121 on the NAS Systems 2000 through network protocols such as TCP/IP. The NFS clients and the NAS System are coupled via the network 5000 that may be a LAN.

The management computer 1100, 1300 is host to a management software 1111 and a VNAS copy management program 1112. NAS management operations such as system configuration settings can be issued from the management software 1111. The VNAS copy management program 1112 maintains a VNAS copy table 1113 depicted in FIG. 3E and stored in the hard disk drive of the management computer 1100. The VNAS copy table stores the remote copy relationships of LUs managed by a VNAS including the source LU, the source storage system and the destination or target LU and storage system locations.

As explained above, the NAS system 2000, 3000 includes the head 2100 and the storage system 2200. The head 2100, that may also be called a gateway, is a part of the NAS System 2000. Operations sent to the NAS system 2000 are processed in the head module. The head module includes VNAS-1 to VNAS-N 2120, 2130, etc, a VNAS management module 2110 and a remote copy module 2150. The NAS system can include a multi-node cluster including a cluster of NAS heads. All of the NAS heads in the cluster may be coupled to the same storage system as the source node (FIG. 3E).

A VNAS 2120, 2130 is a logically separated space of a NAS head, and provides NAS functionalities to the NAS clients. Multiple VNASs can be located on a NAS head. From the NAS client point of view, a VNAS can be seen as an individual NAS System. The VNAS has its own LUs, LVM, root file system, IP addresses, user name space, and process space. Each VNAS typically includes of NFS server 2121 which communicates with NFS client on the NAS clients and processes NFS operations of the file systems managed by the VNAS, a file system (FS) management program 2122 which manages a mount table 2126 (FIG. 3A), a network management program 2123 which manages a routing table 2128 (FIG. 3C), a user management program 2124, and a device management program 2125 which manages a device table 2127 (FIG. 3B). The tables are stored in the storage system 2200. Drivers of the storage system on the NAS head 2100, which are not depicted in FIG. 2, translate the file I/O operations to the block level operations, and communicate with the storage controller 2300 via SCSI commands.

The VNAS management module 2110 includes a VNAS assign program 2111, a failure detection program 2112, a load balancing program 2113, a VNAS assign w/ remote program 2114, a failure detect w/ remote program 2115, and a load balancing w/ remote program 2116. The VNAS assign program 2111 manages the VNAS allocation on a head, and maintains the VNAS management table 2117 that is shown in FIG. 3D and is stored in the storage system 2200. The VNAS management table 2117 contains the LUs corresponding to a VNAS and is shared between NAS heads by the VNAS management program 2110 that resides on each NAS head. The VNAS management program 2110 of one NAS head shares the information in the VNAS management table 2117 and NAS head load information, with the VNAS management program of another NAS head. The failure detection program 2112 detects a VNAS failure in order to failover the failed VNAS to another VNAS on the same NAS head or on another NAS head within the cluster. The load balancing program 2113 monitors the load of each NAS head, and if there is a NAS head which is overloaded, tries to find another NAS head which is lightly loaded in the same cluster, and moves some or all of the VNASs to the lightly loaded NAS head.

The VNAS assign w/ remote program 2114, the failure detection w/ remote program 2115, and the load balancing w/ remote program 2116 are used for the remote VNAS migration and include the VNAS assign 2111, the failure detection 2112, and the load balancing 2113 capabilities, respectively. For example, if the VNAS assign w/ remote program 2114 runs, then the VNAS assign program 2111 does not have to run at the same time, because the VNAS assign program is a subset of VNAS assign w/ remote program.

The VNAS assign w/ remote program 2114 can manage the VNAS allocation on a NAS head at a different NAS system that may be called a remote NAS system. The remote NAS system does not have to be located at a physically remote location. The remote NAS system can be a NAS system constructed by a multiple NAS head cluster and an associated storage system on the same site, in which case, it can serve for load balancing, but does not help for disaster recovery purposes. The remote allocation functionality of the VNAS assign w/ remote program 2114 invokes the remote VNAS migration.

The failure detection w/ remote program 2115 detects a VNAS failure.

The load balancing w/ remote program 2116 monitors the load of each NAS head, and if there is a NAS head which is over loaded, the program tries to find another NAS head which is lightly loaded in the same cluster or at a remote NAS system, and moves some or all of VNAS to the lightly loaded NAS head. Moreover, the load balancing w/ remote program 2116 monitors the load of each NAS head, and if there is a NAS head which is lightly loaded, the program tries to find other NAS heads which are also lightly loaded in a cluster or at a remote NAS system, and moves all of VNASs to the lightly loaded NAS heads to free up the source NAS head. At that point, the source NAS head can be turned off for power saving.

The remote copy program 2150 executes data copy from a NAS head to another NAS head on another NAS System. The target NAS system might be located at a different site. It could be used at data transfer of remote VNAS migration.

The storage system 2200 includes a storage control software 2310, a remote copy 2311 and logical unit volumes LU0 2410, LU1 2402 . . . LUn. The storage control software 2310 processes SCSI commands from the head 2100. The volumes 2401 and 2402 are composed of one or more disk drives 2400. File systems are created in a volume or on multiple volumes. The remote copy program 2311 executes a volume copy from one storage system to another storage system on another NAS system. This provides another option for data transfer from one VNAS to another VNAS by remote migration.

FIG. 3A shows a mount table correlating file systems and device names with mount points according to aspects of the invention. FIG. 3B shows a device table correlating device names and device IDs according to aspects of the invention. FIG. 3C shows a routing table correlating the destination and gateway with the network interface being used according to aspects of the invention. FIG. 3D shows a VNAS management system showing the LUs associated with each VNAS and the VNASs associated with each NAS head according to aspects of the invention. FIG. 3E shows a VNAS copy table including the source and destination node numbers and LU numbers for each source VNAS on a source NAS head according to aspects of the invention.

The contents of the above tables are stored on the devices of the aspects of the invention and are used in the methods according to aspects of the invention as described above and below.

Figure 4:
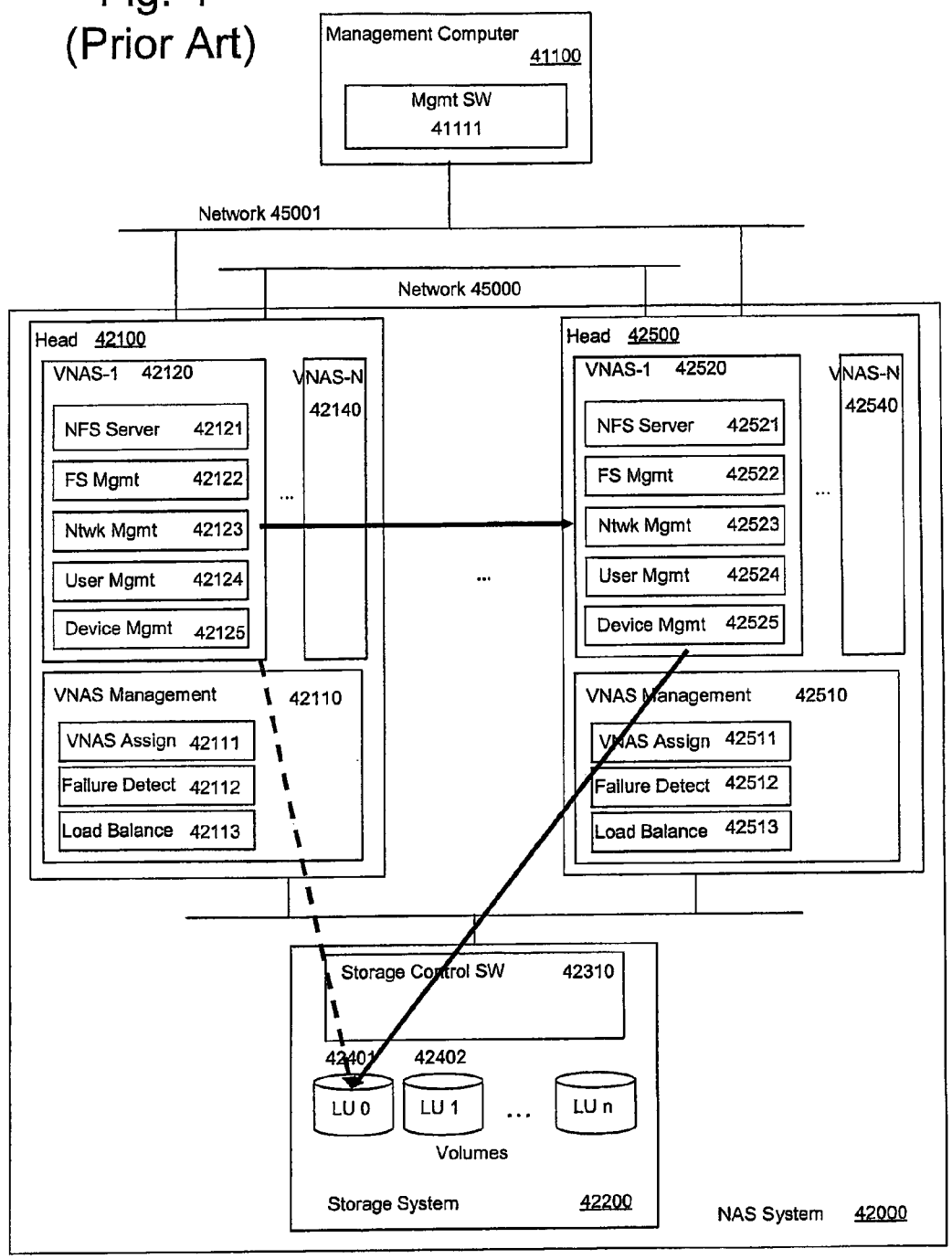
FIG. 4 represents a conceptual diagram of conventional VNAS migration between NAS heads sharing a same storage system.

FIG. 4 represents a conceptual diagram of conventional VNAS migration when all NAS heads share a same storage system. Conventional VNAS migration may occur from VNAS to VNAS on a same NAS head or on different NAS heads when all NAS heads share a same storage system. Each VNAS can be moved between NAS heads. Because NAS heads share the same storage system, the moved VNASs retains the same LUs (i.e. OS LU and user data LU) and there is no need to perform data migration from one storage system to another storage system in response to the VNAS migration.

To achieve high availability, when a VNAS failure such as a VNAS software failure happens, a new VNAS is created on the same NAS head or on another NAS head in the same NAS system. This process may be referred to as moving the VNAS from one NAS head to another NAS head. In case of NAS head failure, all VNASs on the head are moved to other NAS heads. To achieve load balancing, when a NAS head is over loaded, one or more VNASs are moved to other NAS heads.

The process of VNAS migration in case of VNAS software failure is described in the next paragraph. The process of VNAS migration in case of NAS head failure is described in the paragraph after the next.

The process of VNAS migration in case of VNAS software failure is described in this paragraph. First, a failure detection program 42112 in a VNAS management program 42110 of VNAS 42120 detects a failure of the VNAS 42120. Second, a VNAS assign program 42111 at a NAS head 42100, including the failed VNAS 42120, refers to the load information of the NAS heads managed by a load balancing program 42113, and finds an appropriate NAS head such as head 42500 for moving the failed VNAS. There are various selection algorithms for selecting the appropriate NAS head and for example include moving to the least loaded NAS heads. Moreover, an administrator could designate the migration target through a management software 41111 on a management computer 41100 without using the automatic migration target selection by the VNAS assign program 42111 of the failed head 42100. Third, a VNAS assign program 42511 at the migration target NAS head 42500 starts a VNAS 42520 and mounts OS LU 42401 and user data LU 42402 of the failed VNAS to the new VNAS. The LUs are found in the VNAS management table which is shared among the VNAS management programs 42110 to 42510 in a group of clustered NAS heads 42100 to 42500. Then, a VNAS on the target NAS head can read all management related information such as the mount table, the device table, and the routing table from the OS LU 42401. Fourth and last, the VNAS assign program 42511 registers the new VNAS 42520 into the VNAS management table, and deletes the entry of the failed VNAS 42120.

The process of VNAS migration in case of NAS head failure is described in this paragraph. First, the failure detection program 42112 on a NAS head 42100 in a NAS head cluster detects failure of the NAS head 42100. One exemplary algorithm of detecting a NAS head failure is the heart beat method. Second, the VNAS assign program 42111 at the NAS head 42100 where the failure was detected, refers to the load information of the NAS heads managed by the load balancing program 42513, and finds an appropriate NAS head such as the NAS head 42500 to move the VNASs on the failed NAS head 42100 to the NAS head 42500. Furthermore, all VNASs on the failed NAS head do not have to be caused to migrate to the same NAS head and having multiple targets is possible. There are various selection algorithms for selecting NAS heads. Moving to the least loaded NAS head is one of the algorithms used for selecting NAS head. Moreover, an administrator could designate the migration target through the management software 41111 on the management computer 41100 without using the automatic migration target selection by the VNAS assign program. Third, the VNAS assign program 42511 at the migration target NAS head 42500 starts creating VNASs and mounting the associated OS LU and user data LU of each VNAS according to the VNAS management table which is shared among VNAS management programs in a cluster of NAS heads. Fourth, the VNAS assign program 42511 registers the VNASs into the VNAS management table, and deletes the entry of failed VNASs. Fifth and last the third and fourth steps are repeated until all migrating VNASs are migrated to the new NAS head.

To achieve load balancing between NAS heads, a different procedure is used for VNAS migration. One exemplary procedure of VNAS migration for NAS head load balancing is described in this paragraph. First, the load balancing program 42113 in the VNAS management program 42110 finds an over loaded NAS head, for example, the NAS head 42100. Second, the VNAS Assign program 42111 at the over loaded NAS head refers to the load information of the NAS heads managed by load balancing program 42113, and finds an appropriate NAS head such as the NAS head 42500 to move some VNASs to that NAS head. Various selection algorithms for causing the migration of VNASs and selecting target NAS heads may be used. Moreover, an administrator could designate the migrating VNAS and migration target through management software 41111 on the management computer 41100 without using the automatic migrating VNAS and migration target selection by VNAS Assign program. Third, the VNAS assign program 42511 at the migration target NAS head 42500 starts a VNAS 42520 is created and mounts OS LU and user data LU of the migrating VNAS 42120 into the created VNAS 42520, according to the VNAS management table which is shared among the VNAS management programs in a group of clustered NAS heads. The actual take over and occupation of the new VNAS should be delayed until the original VNAS termination is complete. Fourth, the VNAS Assign program 42511 registers the VNAS 42520 into the VNAS management table. Fifth, the VNAS assign program 42111 at the original NAS head terminates the VNAS and deletes the entry of migrated VNAS 42120. The VNAS assign program 42111 at the source notifies the VNAS assign program 42511 at the target of the termination of the original VNAS. Then, the VNAS take over is finally done. Sixth, the steps 3 to 5 are repeated until all migrating VNASs have migrated.

Figure 5:
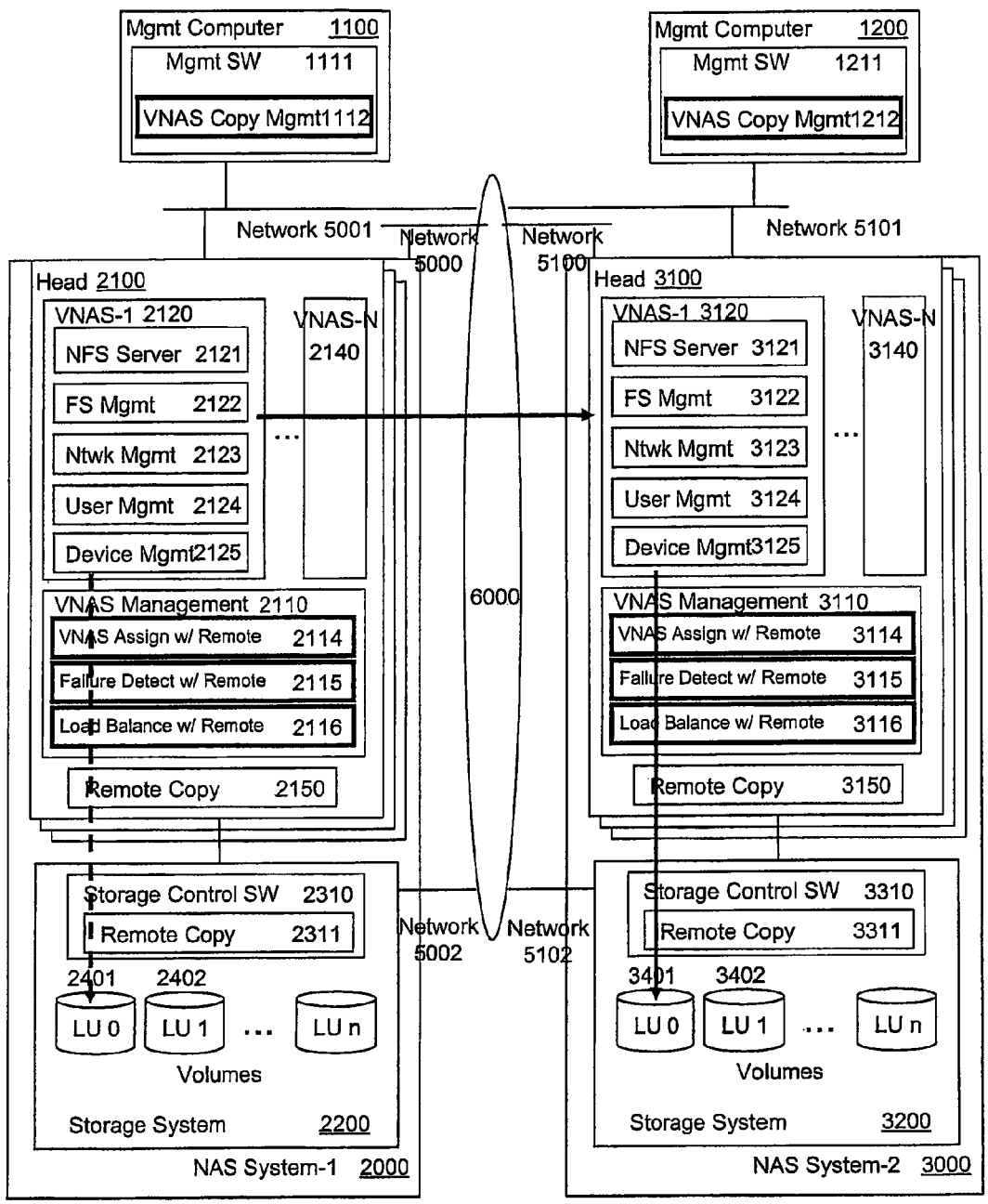
FIG. 5 shows a conceptual diagram of remote VNAS migration according to embodiments of the invention.

FIG. 5 shows a conceptual diagram of remote VNAS migration according to embodiments of the invention. In the conventional migration shown in FIG. 4, all NAS heads available for NAS head migration share the same storage system on the same NAS system. In migration according to aspects of the invention, a VNAS can move to a NAS head which does not share the storage system of the first NAS head, i.e. to another NAS system. This feature is referred to remote VNAS migration.

The second NAS system can be located at the same site as the first NAS system. However, if disaster recovery is a consideration, the second NAS system should be located at a different site.

Remote VNAS migration may provide high availability. When a VNAS failure such as VNAS software failure happens, a new VNAS is created, or in another word "moved," on the same NAS head or on another NAS head. In case of NAS head failure, all VNAS on the head are moved to other NAS heads.

Remote VNAS migration may provide load balancing. When a NAS head is over loaded, more than one VNAS may be moved to other NAS heads for load balancing. Moreover, when NAS heads are lightly loaded, for example at night time, the load from the lightly loaded VNASs may be moved to other NAS heads, and some of NAS heads could be turned down for power saving.

Remote VNAS migration may provide disaster recovery. When a first site is stopped from operation due to events such as a natural disaster, a secondary site may take over the task of the first site.

When compared to VNAS migration on the same NAS system, providing high availability and load balancing extend the migration range from a single system to the other systems. Further, disaster recovery is generally feasible when migration occurs to a second NAS system located at a remote location.

In remote migration like in local migration, the NAS clients do not have to be aware the migration, because the IP address and the shared information can be taken over after the migration. In case of disaster recovery, if the NAS clients are located at the first site, the NAS clients themselves are moved to the different site. If the NAS clients are located outside the first site where the disaster occurs, the NAS clients can continue accessing the same share. Furthermore, if the system environment configurations such as network segment or network servers, i.e. NIS, Active Directory, etc., of the remote site are different from the primary site, the aspects of the present invention provide a method of applying the new system environment configurations.

In FIG. 5, a first NAS system 2000 and a second NAS system 3000 are shown. Each NAS system 2000, 3000 has a head 2100, 3100 and each head includes a number of VNASs. The first NAS system 2000 includes a first storage system 2200 and the second NAS system includes a second storage system 3200. To realize remote VNAS migration, a data copy from the first storage system 2200 to the second storage system 3200 is performed. Without the data copy, the migrating VNAS cannot find its OS LU and user data LU.

Figure 6:
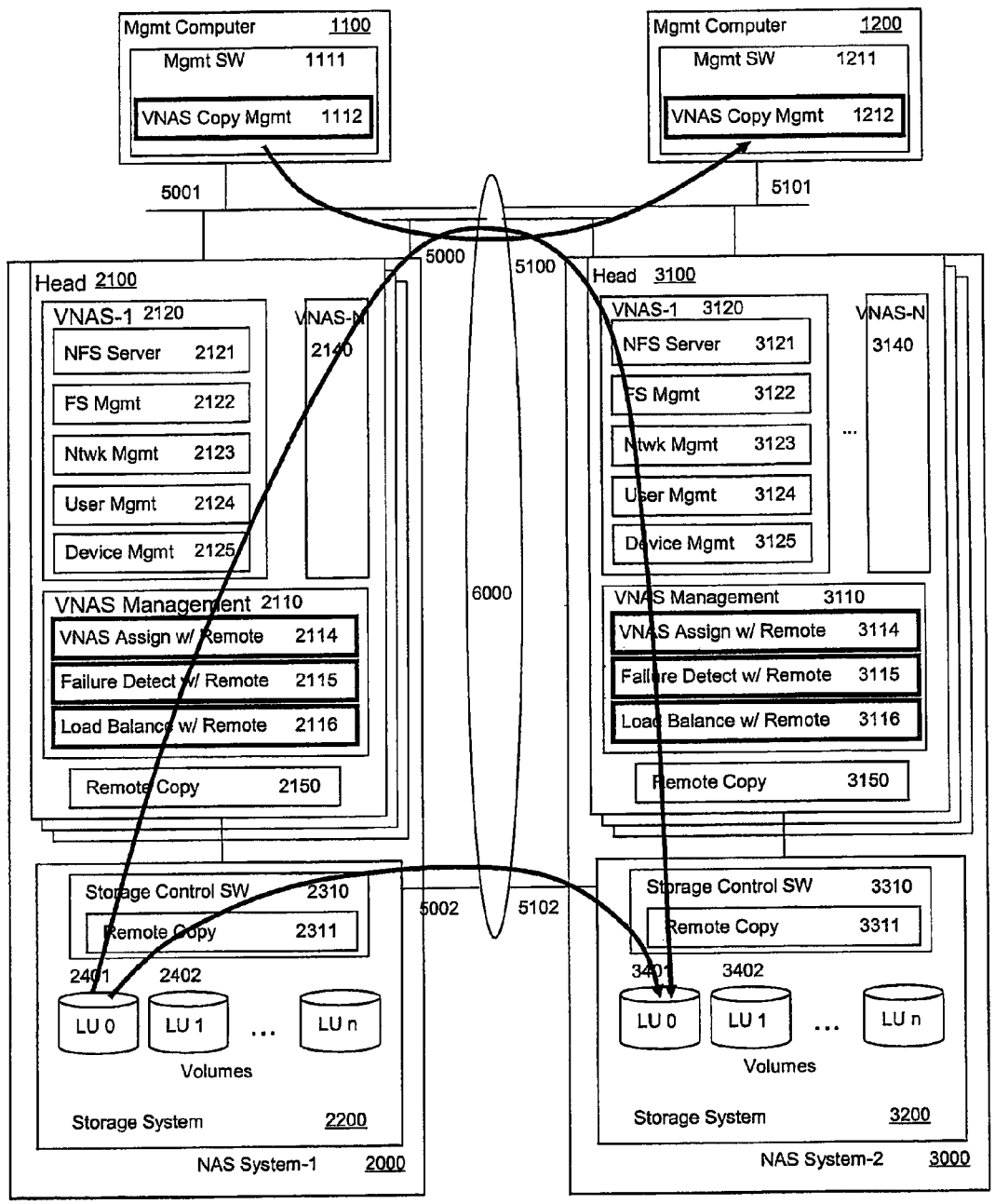
FIG. 6 shows a conceptual diagram of LU remote replication according to aspects of the invention.
Figure 7:
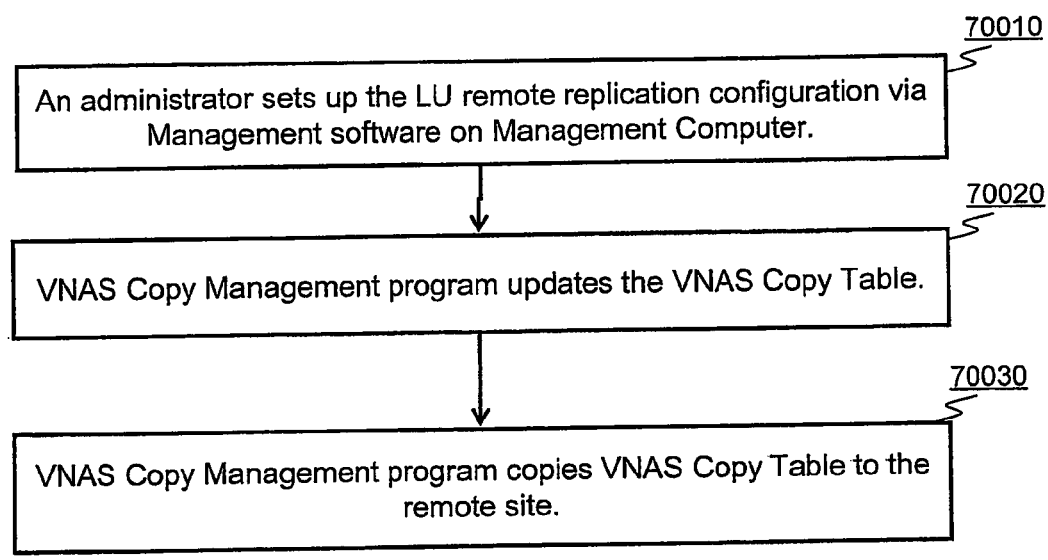
FIG. 7 shows an exemplary flow diagram of a method of VNAS copy table synchronization according to aspects of the invention.

FIG. 6 shows a conceptual diagram of LU remote replication according to aspects of the invention. FIG. 7 shows an exemplary flow diagram of a method of VNAS copy table synchronization according to aspects of the invention.

The remote replication of the LU configuration is done before the remote VNAS migration starts. As shown in the flow diagram of FIG. 7, at 70010, an administrator sets up the LU remote replication configuration via the management software 1211 on the management computer 1100 shown in FIG. 6. At 70020, after the remote replication of the LU settings is complete, the VNAS copy management program 1112 updates the VNAS copy table 1113 of FIG. 3E. The table maintains the relationship between the VNASs, LUs, and the replicated LUs. At 70030, the VNAS copy table 1113 is copied from the VNAS copy management program 1112 at the source site to the VNAS copy management program 1212 at the target. The VNAS copy table is copied through IP networks 5001 and 5101 as the arrow in FIG. 6 shows.

The VNAS copy table can also be managed by the VNAS management program 2110 at the source, and copied to the VNAS management program 3110 at the remote site.

In another aspect of the invention, an administrator at the remote site receives the VNAS copy table update information from the first site, and updates the VNAS copy table manually.

Aspects of the present invention may utilize two different methods for remote copying of LUs. To obtain a NAS based copy, a NAS head copies the data in the LUs through IP networks 5000 and 5100. To obtain a storage-based copy, the storage control software 2310, 3310 copies the data of the LUs through the storage networks 5002 and 5102. FIG. 6 shows one path going from LUs of the first NAS system to the LUs of the second NAS system through the IP networks 5000, 5100 and another path going through the storage network 5002, 5102.

When the secondary storage is close enough in distance and is located less than 100 km away, synchronous replication may be employed. Otherwise, asynchronous replication is employed. If the asynchronous replication is employed, some of data cannot be copied in case of occurrence of a disaster. Aspects of the present invention are not restricted by the method of remote replication.

Figure 8:
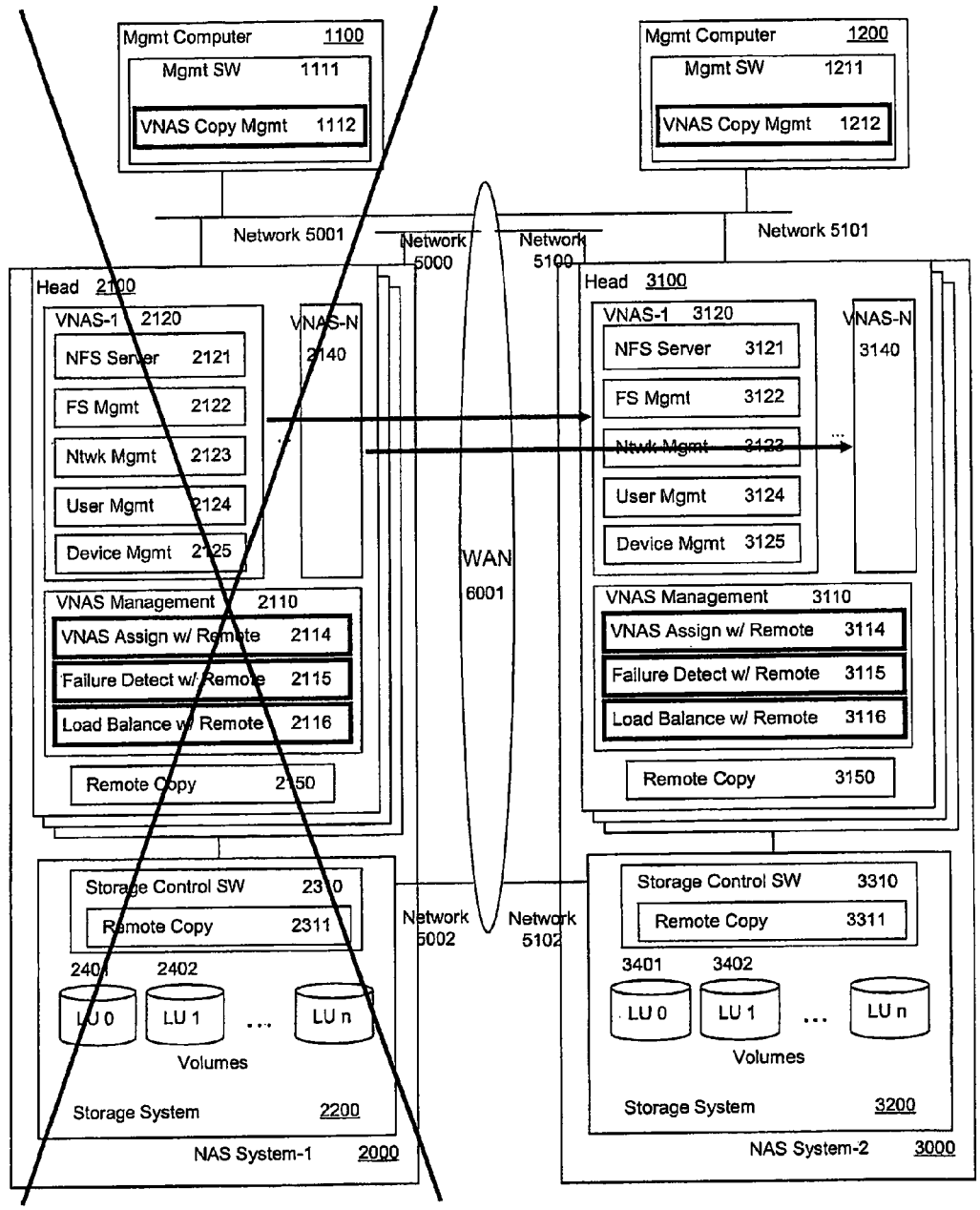
FIG. 8 shows a conceptual diagram of remote VNAS migration for disaster recovery according to aspects of the present invention.
Figure 9:
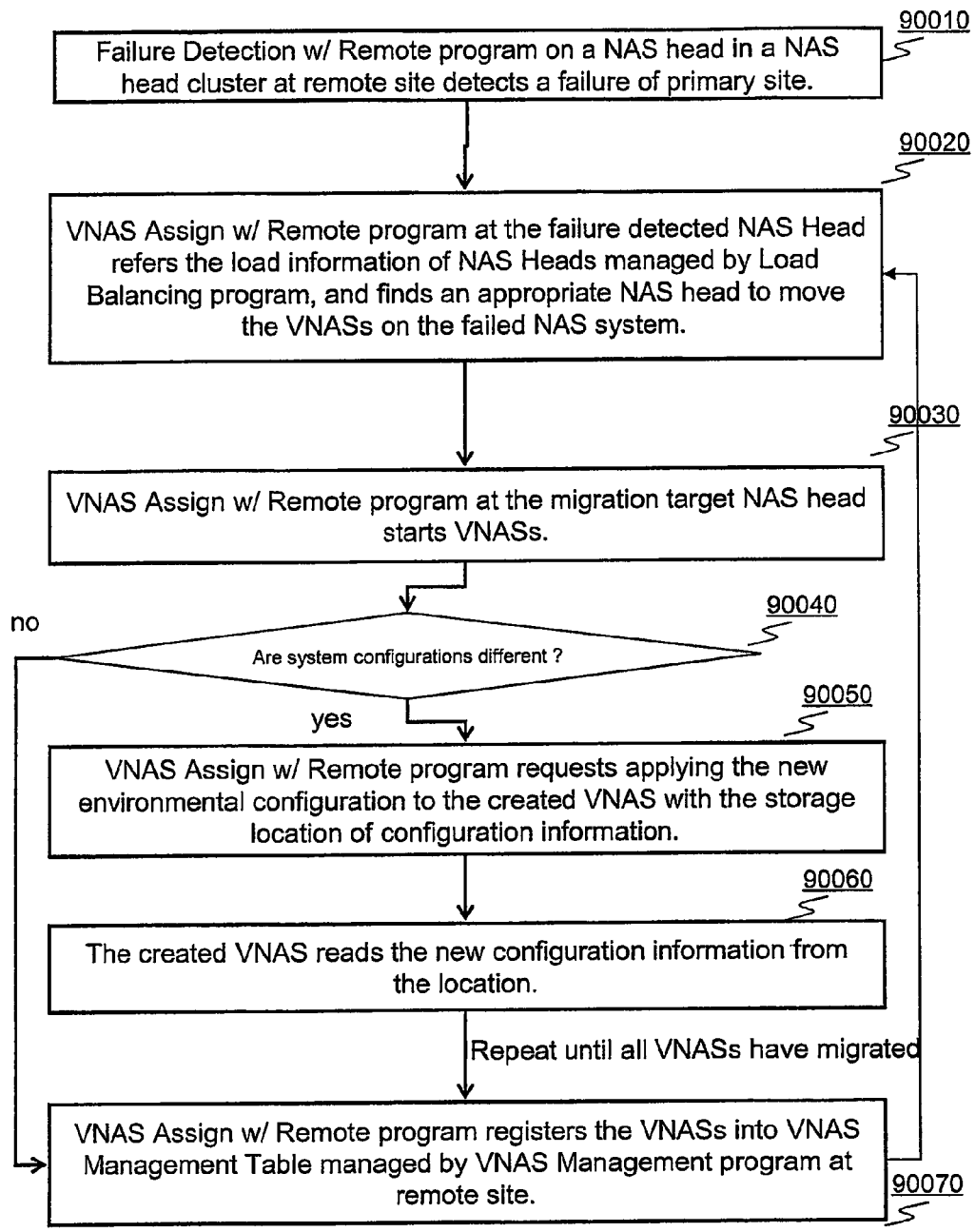
FIG. 9 represents an exemplary flow diagram of a method of remote VNAS migration for disaster recovery according to aspects of the present invention.

FIG. 8 shows a conceptual diagram of remote VNAS migration for disaster recovery according to aspects of the present invention. FIG. 9 represents an exemplary flow diagram of a method of remote VNAS migration for disaster recovery according to aspects of the present invention.

At 90010, a failure detection w/ remote program such as the failure detect program 3115 on a NAS head in a NAS head cluster at a different and remote site detects a failure of primary site. One exemplary method of detecting a NAS head failure is the heart beat method while the detection algorithm does not restrict the invention. A predetermined or selected NAS head can detect the remote failure. Alternatively, a failure detection w/ remote program on any NAS head at the remote site can detect the failure. Furthermore, an administrator or management software 1212 at the remote site could detect the failure of the primary site and invoke the migration process.

At 90020, the VNAS assign w/ remote program such as 3114 refers to the load information of NAS heads managed by the load balancing program 3116, and finds an appropriate NAS head such as the NAS head 3100 to move the VNASs on the failed NAS system 2000 to the NAS head 3100. All VNASs on the failed NAS system need not be sent to the same remote NAS head and having multiple targets is possible. There are a number of selection algorithms available for selecting a NAS head. Embodiments of the invention, however, are not restricted by the algorithm used. Moreover, an administrator could designate the migration target through the management software 1211 on the management computer 1200 without using the automatic migration target selection by the VNAS assign program w/ remote.

At 90030, the VNAS assign w/ remote program 3114 at the migration target NAS head 3100 starts VNASs and according to the VNAS copy table, mounts the associate OS LU and user data LU of each old VNAS into the new VNAS. The VNAS copy table is copied between the source and target VNAS copy management programs 1112, 1212 on the management computers 1100, 1200.

The system environment configurations such as network segment or network servers (i.e. NIS, Active Directory, etc.) of the remote site may be different from the primary site. At 90040, the created VNAS checks the configurations stored in some LU on the storage system 2200 or on the management computer 1100 after boot up to determine whether the configurations of the source and target sites are different.

If the configurations are different, at 90050, when the VNAS is moved from a primary site that is present on the site list, the VNAS assign w/ remote program requests applying the new environment configuration to the created VNAS with the storage location of configuration information, i.e. LUN or a path name on the management computer.

At 90060, the created VNAS reads the new configuration information from the storage location of the configuration information.

At 90070, the VNAS assign w/ remote program 3114 registers the VNASs into the VNAS management table 2117 of FIG. 3D managed by the VNAS management program 3110 at the remote site.

All the steps after failure detection are repeated until all VNASs have migrated from the failed site to an alternative site. When the above processes end, the relationship between the remote copy and the original can be kept in order to prepare for a recovery phase. Otherwise, the remote copy relationship may be discarded and another remote copy relationship may be created if the NAS system at the disaster site is to be rebuilt at a later date. Alternatively, only the NAS operations may be maintained without any remote copy. This embodiments uses a WAN 6001.

Figure 10:
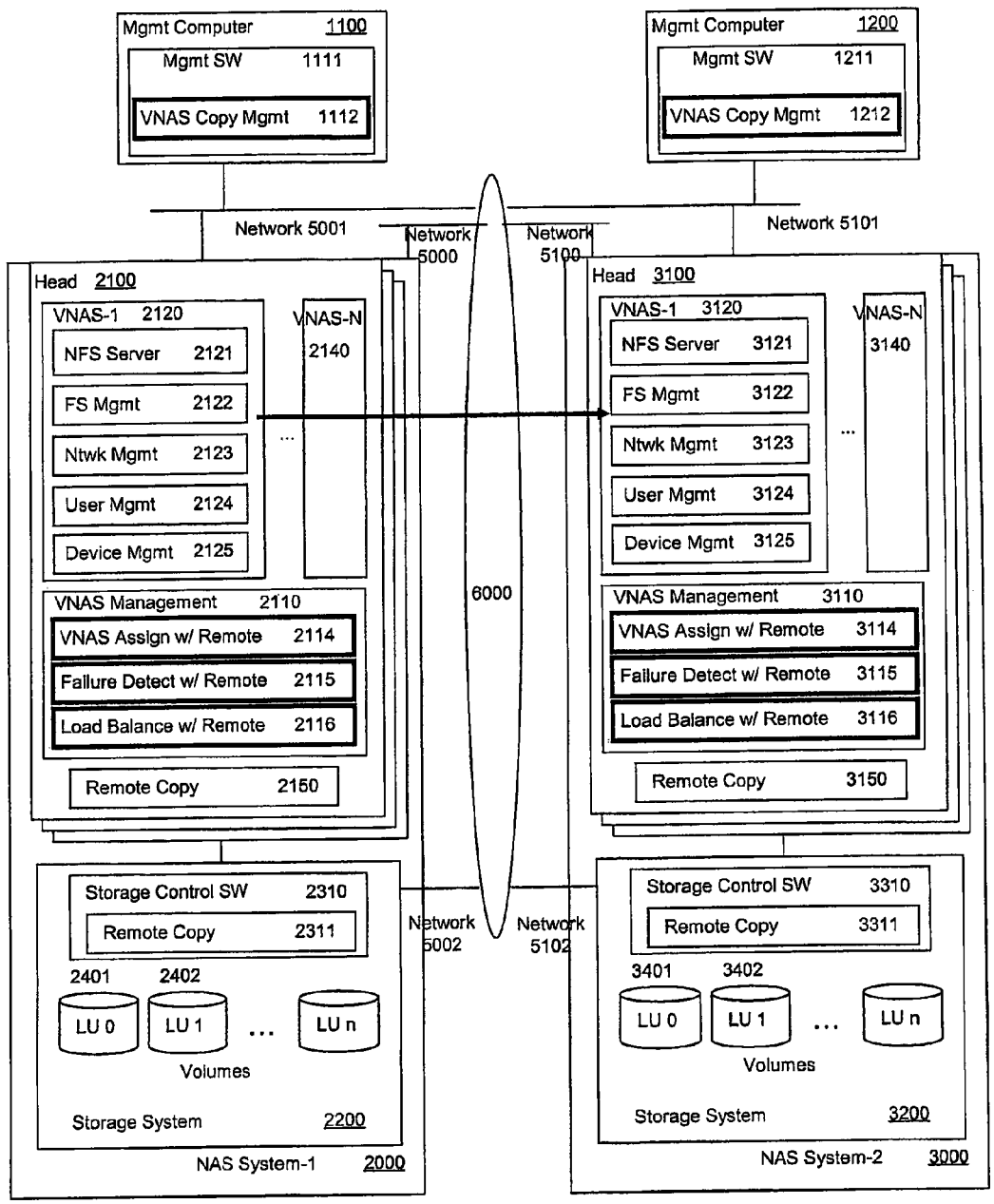
FIG. 10 shows a conceptual diagram of remote VNAS migration for remote load balancing according to aspects of the invention.
Figure 11A:
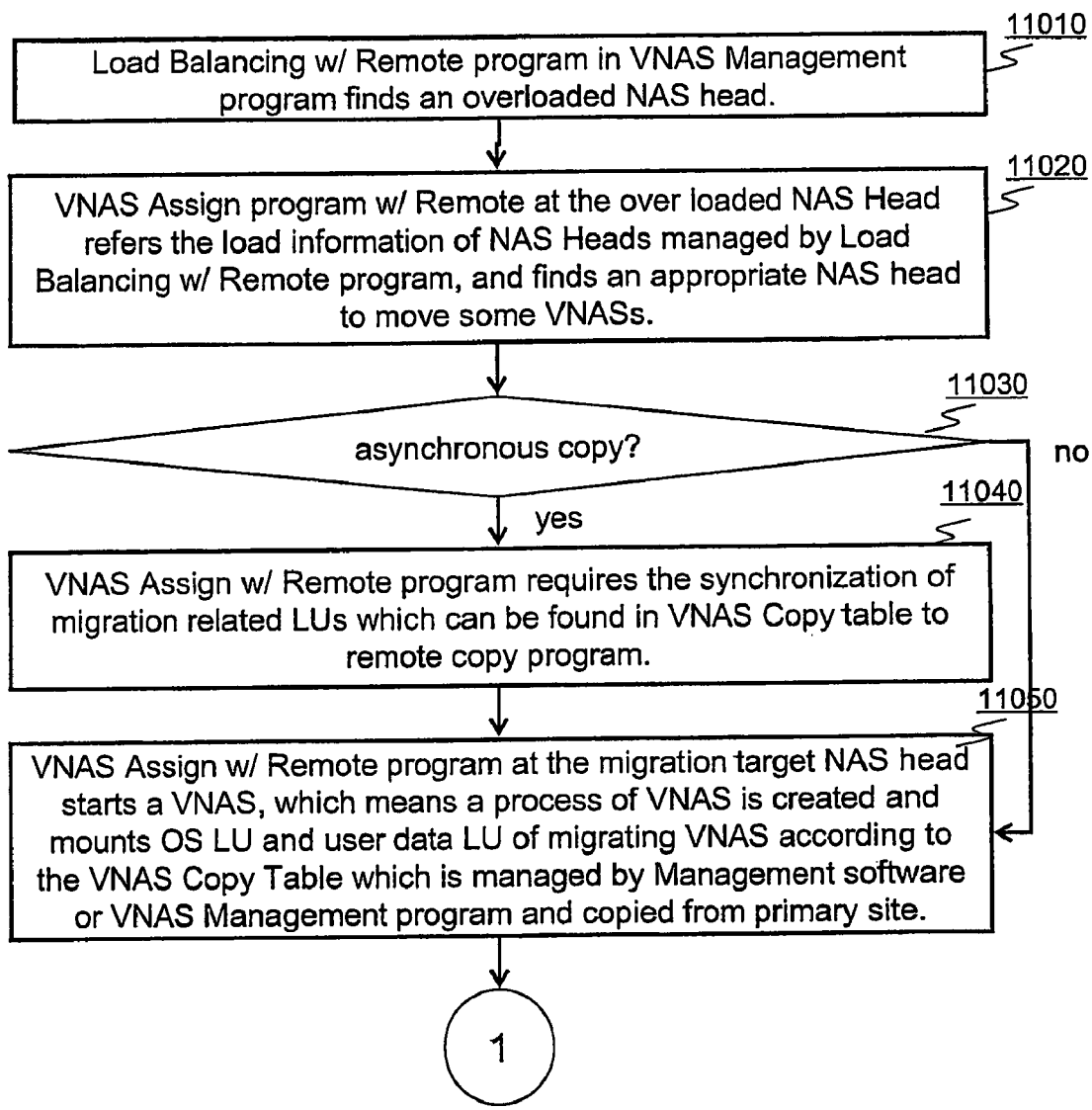
FIG. 11A and FIG. 11B represent an exemplary flow diagram of remote VNAS migration for remote load balancing according to aspects of the invention.
Figure 11B:
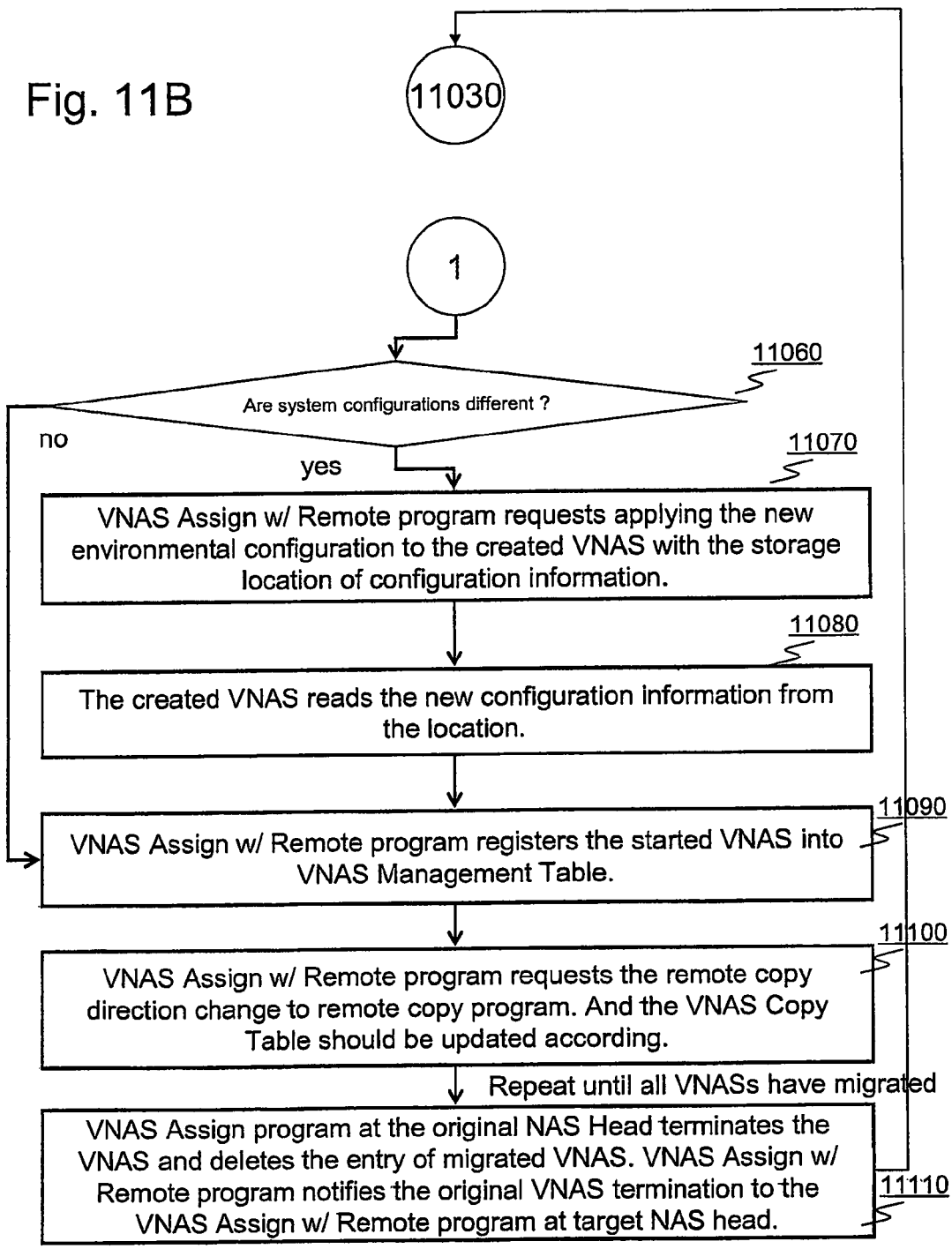

FIG. 10 shows a conceptual diagram of remote VNAS migration for remote load balancing according to aspects of the invention. FIG. 11A and FIG. 11B represent an exemplary flow diagram of remote VNAS migration for remote load balancing according to aspects of the invention.

VNAS migration for load balancing, extends the migration range from a single system to a single system to from a single system to a number of systems.

At 11010, the load balancing w/ remote program 2116 in the VNAS management program 2110 at the first NAS head 2100 finds that the NAS head 2100 is overloaded.

At 11020, the VNAS assign program w/ remote 2114 at the over loaded NAS head 2100 refers to the load information of NAS heads shared by load balancing w/ remote program 2116, and finds an appropriate NAS head such as NAS head 3100 for moving some VNASs to the NAS head 3100. The NAS heads that are the target of the migration may or may not be remote. To include NAS heads that are located at a remote location, the load balancing information should be shared not only by the local NAS heads but also by remote NAS heads. Alternatively, the load balancing information gathered by each load balancing w/ remote program 2116 can be gathered on the management software 1111 of the associated management computer 1100, and shared with the management software 1211 of the management computer 1200 associated with a remote NAS head. Several selection algorithms may be used for causing the VNAS to migrate and for selecting the target NAS head. Embodiments of the invention are not restricted to the choice of the algorithm. Moreover, an administrator could designate the migrating VNAS and the migration target through the management software 1111 on the management computer 1100 without using the automatic migration.

At 11030, it is determined whether the remote replication is synchronous or asynchronous.

At 11040, when asynchronous remote replication is used, the VNAS assign w/ remote program 2114 requires the synchronization of migration related LUs which can be found in the VNAS copy table to the remote copy program 2150 or 2311. An administrator can start the synchronization process via the management software 1111 if the VNAS assign w/ remote program 2114 does not automatically start the synchronization process.

At 11050, the VNAS assign w/ remote program 3114 at the migration target NAS head 3100 starts a VNAS 3120 and mounts OS LU and user data LU of the migrating VNAS according to the VNAS copy table which is managed by management software 1211 at the management computer 1200 associated with the target or by the VNAS management program 3110 at the target and is copied from the primary site. The actual populating and taking over of the target VNAS may be delayed until the termination of the original VNAS is complete.

At 11060, it is determined whether the system configurations of the target and the source are different.

At 11070, in case the system environment configurations, such as the network segment or the network servers, i.e. NIS, Active Directory, etc., of the target site are different from the source site, the created VNAS checks the configurations stored in some LU on the storage system 2200 or management computer 1100 of the primary site after boot up. In one example, the administrator configures the VNAS assign w/ remote program 3114 to include a site list of sites that have a different configuration. When the VNAS is moved from a primary site that is present on the site list, the VNAS assign w/ remote program requests applying the new environment configuration to the created VNAS with the storage location of configuration information, i.e. LUN or a path name on the management computer.

At 11080, the newly created VNAS at the target reads the new configuration information from the storage location.

At 11090, the VNAS assign w/ remote program 3114 of the target registers the started VNAS 3120 into the VNAS management table.

At 11100, the VNAS assign w/ remote program 3114 requests for a direction change in the remote copying performed by the remote copy program 3150, 3311. Namely, the copying direction changes from a direction from the primary NAS to the secondary NAS to the opposite direction that copies from the secondary NAS to the primary NAS. The VNAS copy table at the source is updated accordingly such that the original entry is deleted and a new entry for the remote copy information is created.

At 11110, the VNAS assign program 2111 at the original NAS head terminates the original VNAS and deletes the entry of the VNAS 2120 that has since migrated to another NAS head. The VNAS assign w/ remote program 2114 reports the original VNAS termination to the VNAS assign w/ remote program 3114 at the target NAS head. Then, the VNAS migration is complete.

Steps 11030 through 11110 are repeated until all migrating VNASs have migrated.

Figure 12:
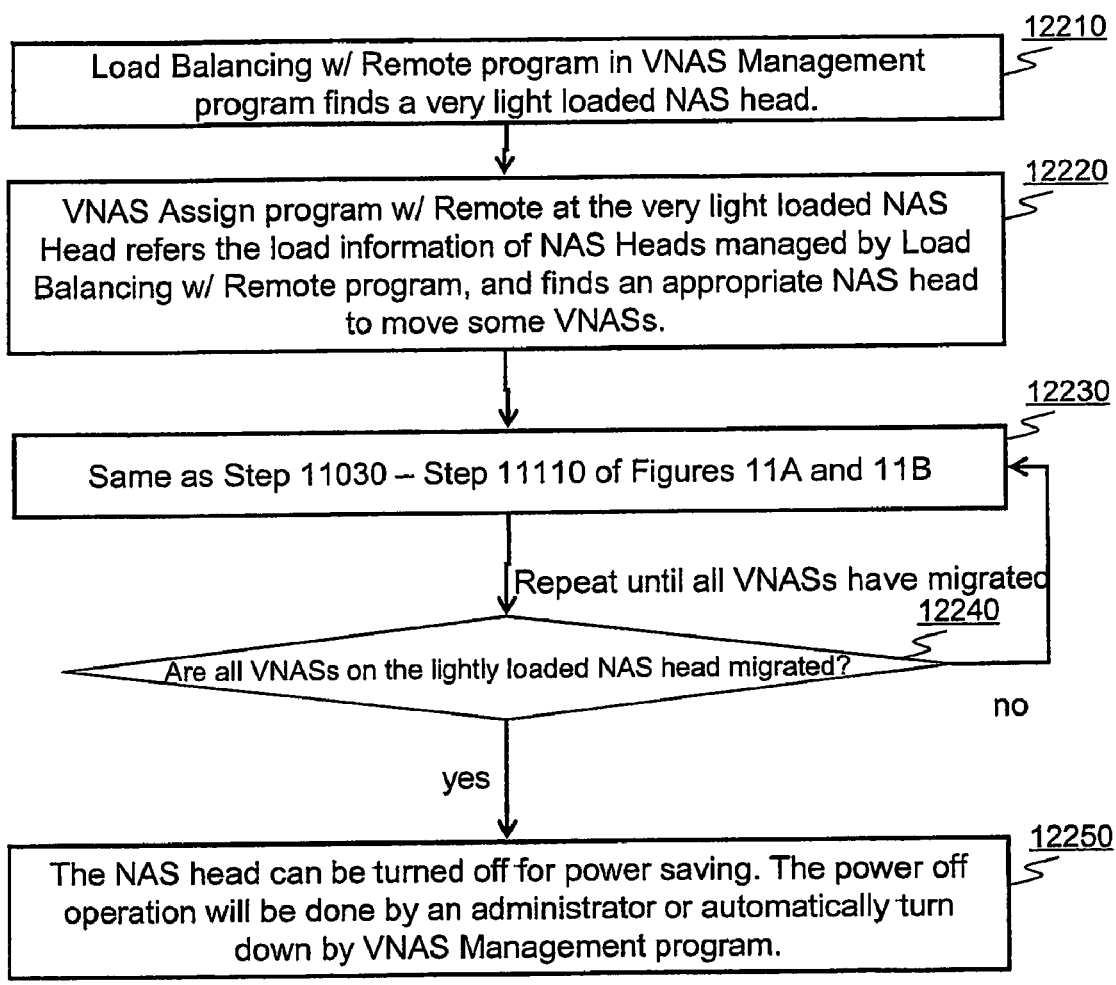
FIG. 12 shows an exemplary flow diagram of remote VNAS migration for power saving according to aspects of the invention.

FIG. 12 shows an exemplary flow diagram of remote VNAS migration for power saving according to aspects of the invention.

At 12210, the load balancing w/ remote program 2116 in the VNAS management program 2110 at the source NAS head determines that the source is lightly loaded.

At 12220, the VNAS assign program w/ remote 2114 at the lightly loaded NAS head refers to the load information of the NAS heads managed by load balancing w/ remote program 2116, and finds an appropriate NAS head to move some of the VNASs to. Various selection algorithms for migrating VNASs and target NAS heads may be used. Embodiments of the invention are not restricted by the type of algorithm selected. Moreover, an administrator could designate the migrating VNAS and migration target through the management software 1111 on the management computer 1100 without using automatic selection of the migrating VNAS and the migration target by the VNAS assign w/ remote program.

At 12230, steps similar to steps 11030-11110 of FIGS. 11A and 11B are performed.

At 12250, if the all VNASs on a lightly loaded NAS head are moved, and there is no VNAS on the originating head, the NAS head can be turned off for power saving. The power off operation may be done by an administrator or may occur by automatic turn down by the VNAS management program 2110. Moreover, when the power off feature is used, a subsequent power on may be done by an administrator or by the VNAS management program at an appropriate time, for example at the scheduled time of high workload.

Figure 13A:
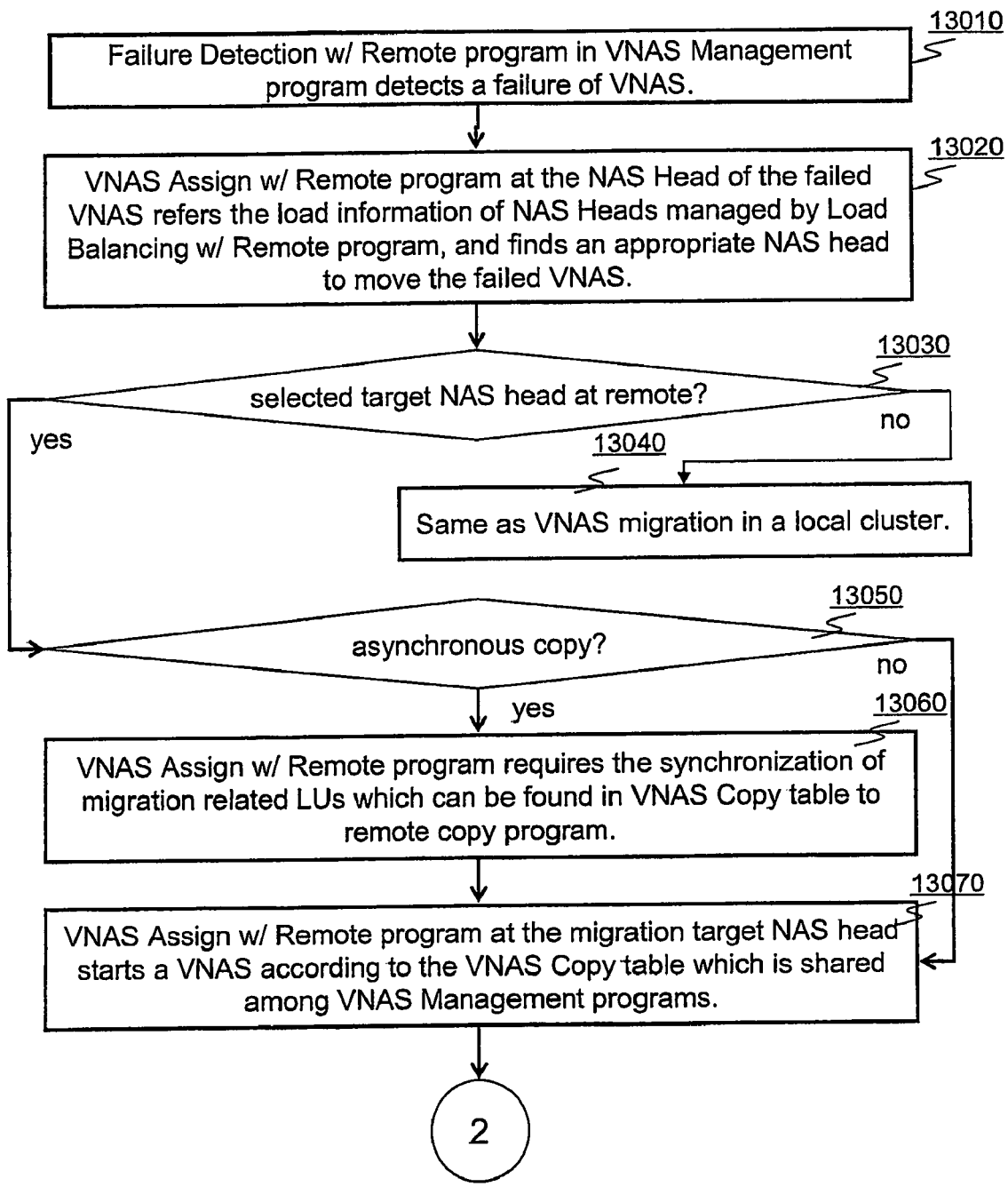
FIG. 13A and FIG. 13B represent an exemplary flow diagram for remote VNAS migration for securing high availability after VNAS software failure according to aspects of the invention.
Figure 13B:
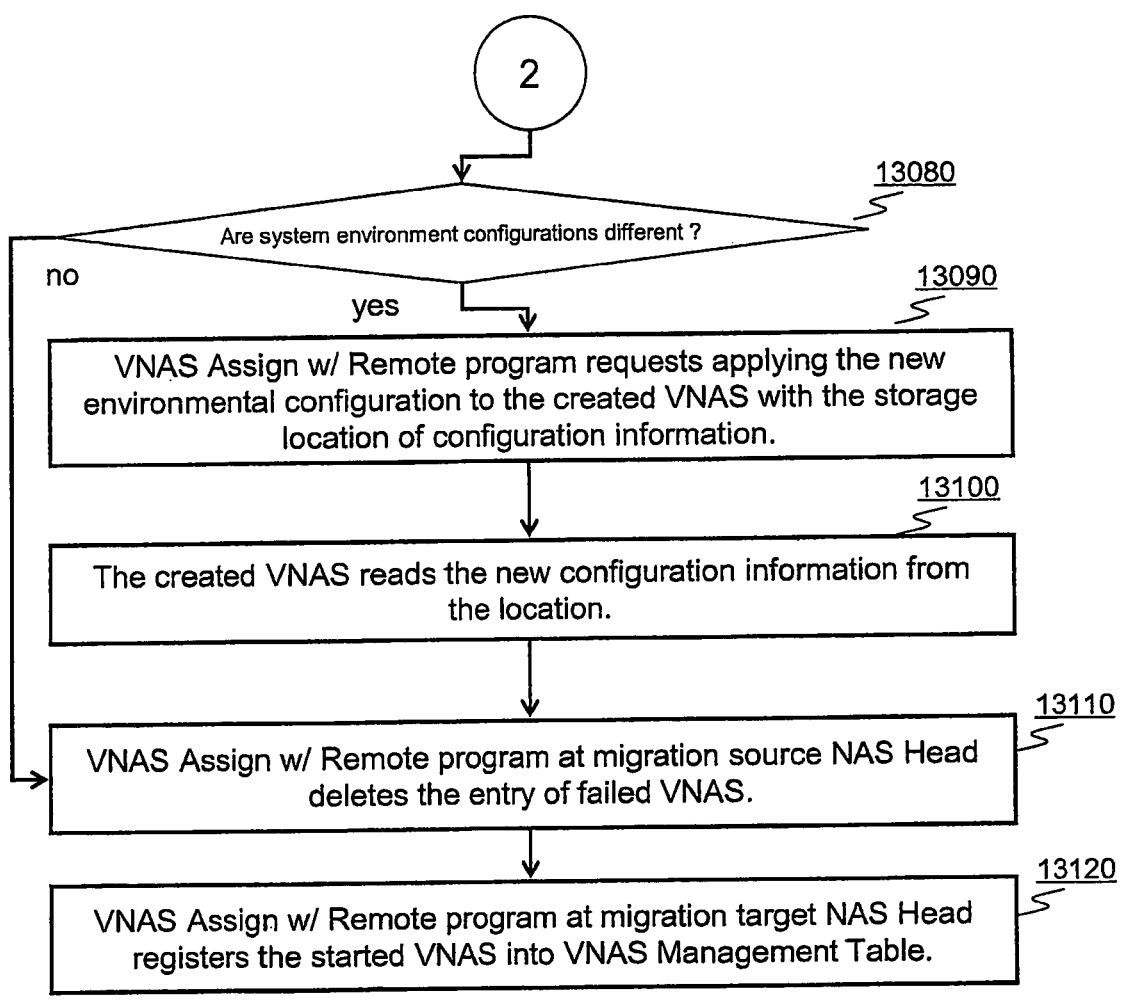

FIG. 13A and FIG. 13B represent an exemplary flow diagram for remote VNAS migration for securing high availability after VNAS software failure according to aspects of the invention. This procedure is described using the system of FIG. 10.

In this embodiment, the migration range is extended from a single system to other systems while unlike the disaster recovery cases, the migration target NAS head does not have to be physically remote. Migration happens when there is no appropriate migration target NAS head in the local cluster, for example, when all of the NAS heads at the local cluster are very highly loaded.

At 13010, the failure detection w/ remote program 2115 in the VNAS management program 2110 detects a failure of VNASs such as the VNAS 2120.

At 13020, the VNAS assign w/ remote program 2114 at the NAS head of the failed VNAS refers the load information of the NAS heads managed by the load balancing w/ remote program 2116, and finds an appropriate NAS head such as the NAS head 3100 to move the failed VNAS to. In this case, the target or migration NAS heads include remote NAS heads. Therefore, the load balancing information should be shared not only by local NAS heads but also by remote NAS heads. Or, the load balancing information gathered by each load balancing w/ remote program can be gathered on the management software 1111, and shared with the management software 1211 at the remote location. There are various selection algorithms for selecting the target NAS head. Moving to the least loaded NAS head is one of the simplest algorithms. The invention is not restricted by the selection algorithms. Moreover, an administrator could designate the migration target through the management software 1111 on the management computer 1100 without using the automatic migration target selection by the VNAS assign w/ remote program.

At 13060, if the migration target NAS head is remote, and asynchronous remote replication is used, the VNAS assign w/ remote program 2114 at the source requires the synchronization of migration related LUs which can be found in VNAS copy table to remote copy program 2150 or 2311. An administrator can start the synchronization process via the management software 1111 if the VNAS assign w/ remote program does not automatically start the synchronization process.

At 13070, the VNAS assign w/ remote program 3114 at the migration target NAS head 3100 starts a VNAS 3120 and mounts the copied OS LU 3410 and the user data LU 3420 of the failed VNAS or the original VNAS according to the VNAS copy table which is shared among the VNAS management programs.

In FIG. 12B, at 13080, it is determined if the system environment configurations, such as network segment or network servers (i.e. NIS, Active Directory, etc.), of the remote site are different from the primary site.

At 13090, in case the system environment configurations of the remote site are different from the primary site, the created VNAS checks the configurations stored in some LU on the storage system 2200 or the management computer 1100 after boot up. To do that, the administrator may configure the VNAS assign w/ remote program 3114 to include a site list of the sites which have a different configuration. When the VNAS is moved from a site on the list, the VNAS assign w/ remote program requests applying the new environment configuration to the created VNAS and asks for the storage location of configuration information (i.e. LUN or a path name on management computer).

At 13100, the created VNAS reads the new configuration information from the storage location.

At 13110, the VNAS assign w/ remote program at the migration source NAS head 2114 deletes the entry of failed VNAS 2120. At 13120, the VNAS assign w/ remote program at migration target NAS head 3114 registers the newly created VNAS 3120 into VNAS management table.

Figure 14A:
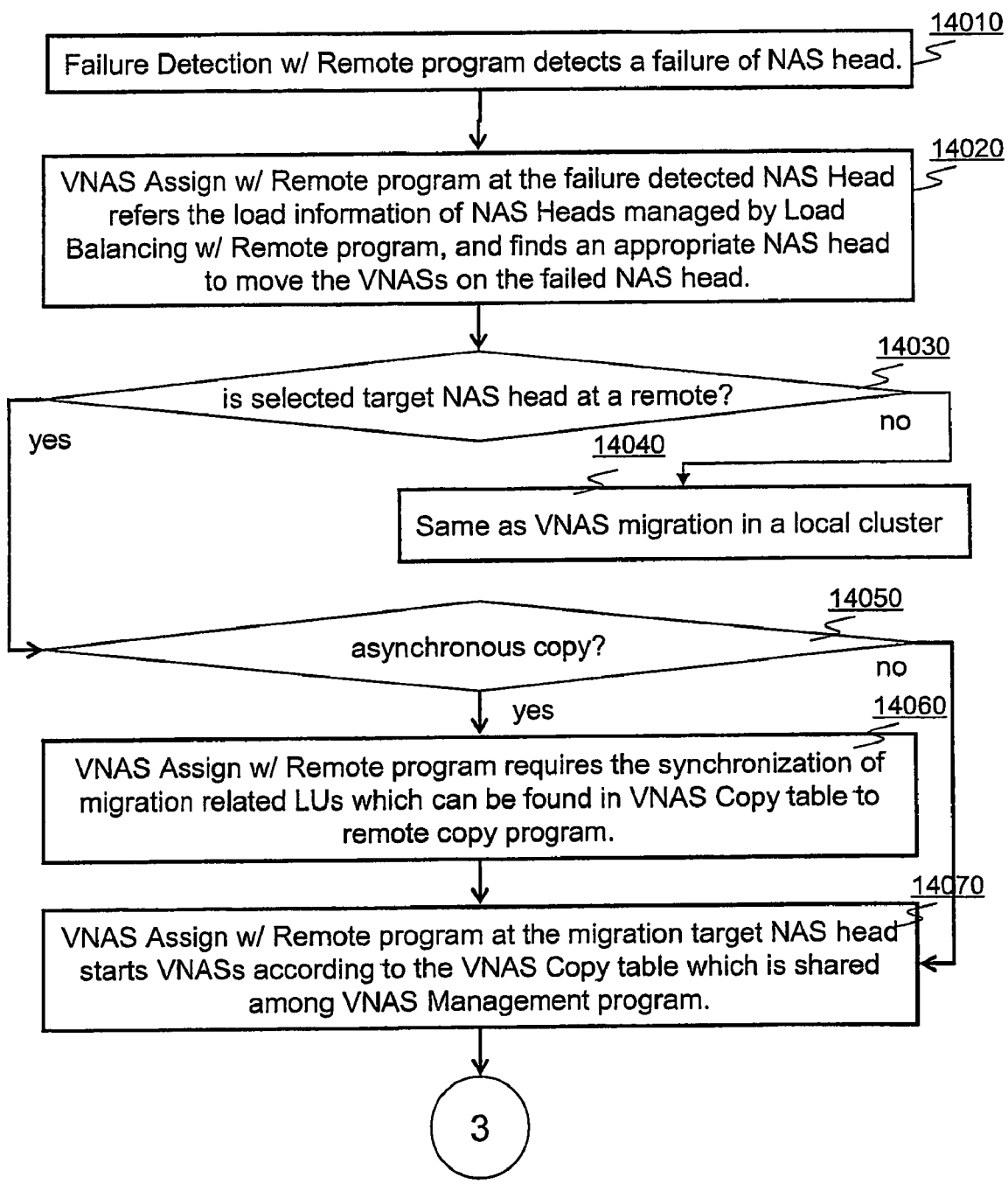
FIG. 14A and FIG. 14B show an exemplary flow diagram for remote VNAS migration to achieve high availability in case of failure of NAS heads according to aspects of the invention.
Figure 14B:
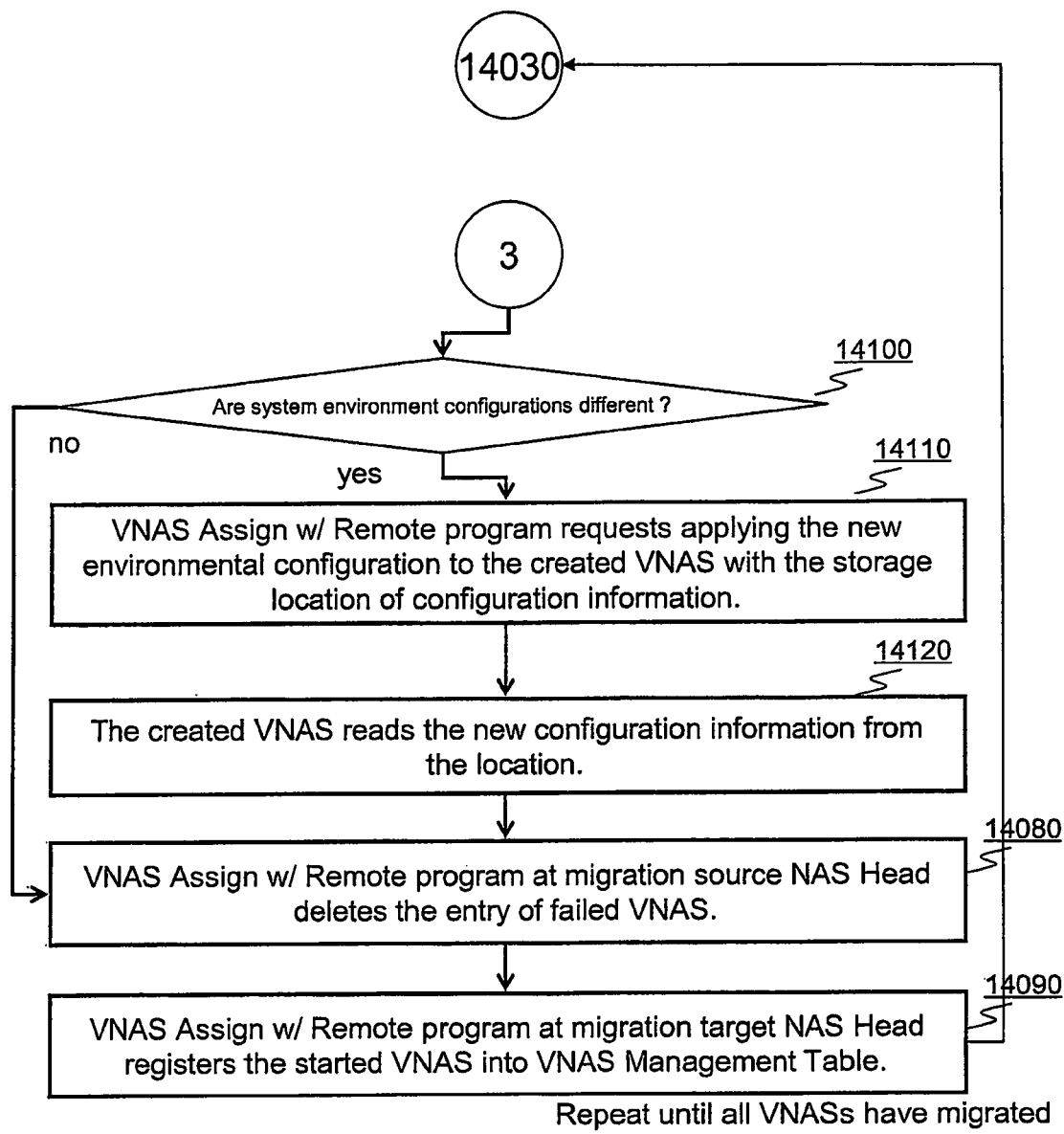

FIG. 14A and FIG. 14B show an exemplary flow diagram for remote VNAS migration to achieve high availability in case of failure of NAS heads according to aspects of the invention.

At 14010, the failure detection w/ remote program, such as 2115 in FIG. 10, detects failure of a NAS head 2200 that is not depicted in FIG. 10. One exemplary method of detecting a NAS head failure is the heart beat method. Embodiments of the invention, however, are not restricted by the detection algorithm.

At 14020, the VNAS assign w/ remote program 2114 at the failure detected NAS head 2120 refers to the load information of NAS heads managed by the load balancing w/ remote program 2116, and finds an appropriate NAS head such as NAS head 3100 for moving the VNASs on the failed NAS head 2200 to the new NAS head 3100. Furthermore, all of the VNASs on the failed NAS head need not migrate to the same NAS head and having multiple targets is possible. In this case, the target or migration NAS heads include remote NAS heads. The load balancing information is shared not only by local NAS heads but also by remote NAS heads. In one example, the load balancing information gathered by each load balancing w/ remote program can be collected on the management software 1111, and shared with the remote management softwares 1211. There are various selection algorithms for selecting NAS heads. Moving to the least loaded NAS head is one of the algorithms. Embodiments of the invention are not restricted by the selection algorithms, however. Moreover, an administrator could designate the migration target through the management software 1111 on the management computer 1100 without using the automatic migration target selection by the VNAS assign w/ remote program.

At 14060, if the migration target NAS head is remote, and asynchronous remote replication is used, the VNAS assign w/ remote program 2114 requires the synchronization of migration related LUs which can be found in VNAS Copy table to the remote copy program 2150 or 2311. An administrator can start the synchronization process via the management software 1111 if the VNAS assign w/ remote program does not automatically start the synchronization process.

At 14110, in case the system environment configurations such as network segment or network servers (i.e. NIS, Active Directory, etc.) of the remote site are different from the primary site, the created VNAS checks the configurations stored in some LU on storage system 2200 or on the management computer 1100 after boot up. To do that, the administrator configured VNAS assign w/ remote program 3114 includes a site list which has a list of sites known to have a different configuration. When the VNAS is moved from a site on the list, the VNAS assign w/ remote program requests applying the new environment configuration to the created VNAS and requests for the storage location of configuration information (i.e. LUN or a path name on management computer).

At 14120, the created VNAS reads the new configuration information from the location.

At 14070, the VNAS assign w/ remote program 3114 at the migration target NAS head 3100 starts VNASs, by creating a process of VNASs and mounting each OS LU and user data LU of the associated VNAS according to the VNAS Copy table which is shared among the VNAS management programs 2110, 3110.

At 14080, the VNAS assign w/ remote program 2114 at the migration source deletes the entry of failed VNASs.

At 14090, the VNAS assign w/ remote program 3114 at the migration target registers the newly started VNAS 3120 into the VNAS management table.

Steps 14030 to 14090 are repeated until all migrating VNASs have migrated.

When the above processes end, the remote copy relationships can be kept in order to prepare for the recovery phase. Otherwise, the remote copy relationship can be discarded, and another remote copy relationship can be created. In one example, only the NAS operations are kept and no remote copy is kept.

Figure 15:
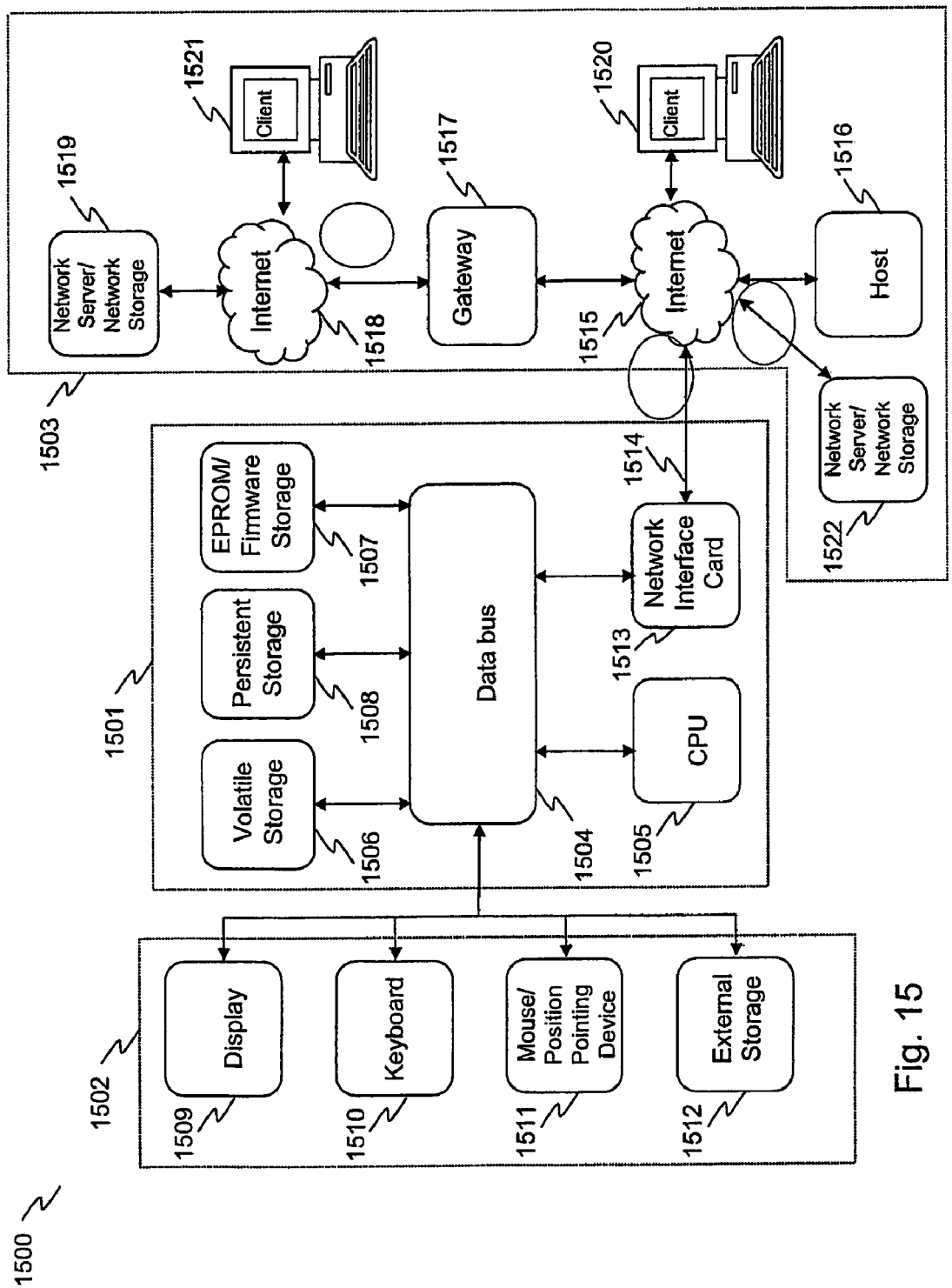
FIG. 15 illustrates an exemplary embodiment of a computer platform upon which the inventive system may be implemented.

FIG. 15 is a block diagram that illustrates an embodiment of a computer/server system 1500 upon which an embodiment of the inventive methodology may be implemented. The system 1500 includes a computer/server platform 1501, peripheral devices 1502 and network resources 1503.

The computer platform 1501 may include a data bus 1504 or other communication mechanism for communicating information across and among various parts of the computer platform 1501, and a processor 1505 coupled with bus 1501 for processing information and performing other computational and control tasks. Computer platform 1501 also includes a volatile storage 1506, such as a random access memory (RAM) or other dynamic storage device, coupled to bus 1504 for storing various information as well as instructions to be executed by processor 1505. The volatile storage 1506 also may be used for storing temporary variables or other intermediate information during execution of instructions by processor 1505. Computer platform 1501 may further include a read only memory (ROM or EPROM) 1507 or other static storage device coupled to bus 1504 for storing static information and instructions for processor 1505, such as basic input-output system (BIOS), as well as various system configuration parameters. A persistent storage device 1508, such as a magnetic disk, optical disk, or solid-state flash memory device is provided and coupled to bus 1501 for storing information and instructions.

Computer platform 1501 may be coupled via bus 1504 to a display 1509, such as a cathode ray tube (CRT), plasma display, or a liquid crystal display (LCD), for displaying information to a system administrator or user of the computer platform 1501. An input device 1510, including alphanumeric and other keys, is coupled to bus 1501 for communicating information and command selections to processor 1505. Another type of user input device is cursor control device 1511, such as a mouse, a trackball, or cursor direction keys for communicating direction information and command selections to processor 1504 and for controlling cursor movement on display 1509. This input device typically has two degrees of freedom in two axes, a first axis (e.g., x) and a second axis (e.g., y), that allows the device to specify positions in a plane.

An external storage device 1512 may be coupled to the computer platform 1501 via bus 1504 to provide an extra or removable storage capacity for the computer platform 1501. In an embodiment of the computer system 1500, the external removable storage device 1512 may be used to facilitate exchange of data with other computer systems.

The invention is related to the use of computer system 1500 for implementing the techniques described herein. In an embodiment, the inventive system may reside on a machine such as computer platform 1501. According to one embodiment of the invention, the techniques described herein are performed by computer system 1500 in response to processor 1505 executing one or more sequences of one or more instructions contained in the volatile memory 1506. Such instructions may be read into volatile memory 1506 from another computer-readable medium, such as persistent storage device 1508. Execution of the sequences of instructions contained in the volatile memory 1506 causes processor 1505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1505 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1508. Volatile media includes dynamic memory, such as volatile storage 1506. Transmission media includes coaxial cables, copper wire and fiber optics, including the wires that comprise data bus 1504. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1505 for execution. For example, the instructions may initially be carried on a magnetic disk from a remote computer. Alternatively, a remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on the data bus 1504. The bus 1504 carries the data to the volatile storage 1506, from which processor 1505 retrieves and executes the instructions. The instructions received by the volatile memory 1506 may optionally be stored on persistent storage device 1508 either before or after execution by processor 1505. The instructions may also be downloaded into the computer platform 1501 via Internet using a variety of network data communication protocols well known in the art.

The computer platform 1501 also includes a communication interface, such as network interface card 1513 coupled to the data bus 1504. Communication interface 1513 provides a two-way data communication coupling to a network link 1514 that is coupled to a local network 1515. For example, communication interface 1513 may be an integrated services digital network (ISDN) card or a modem to provide a data communication connection to a corresponding type of telephone line. As another example, communication interface 1513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1513 sends and receives electrical, electromagnetic or optical signals that carry digital data streams representing various types of information.

Network link 1513 typically provides data communication through one or more networks to other network resources. For example, network link 1514 may provide a connection through local network 1515 to a host computer 1516, or a network storage/server 1517. Additionally or alternatively, the network link 1513 may connect through gateway/firewall 1517 to the wide-area or global network 1518, such as an Internet. Thus, the computer platform 1501 can access network resources located anywhere on the Internet 1518, such as a remote network storage/server 1519. On the other hand, the computer platform 1501 may also be accessed by clients located anywhere on the local area network 1515 and/or the Internet 1518. The network clients 1520 and 1521 may themselves be implemented based on the computer platform similar to the platform 1501.

Local network 1515 and the Internet 1518 both use electrical, electromagnetic or optical signals that carry digital data streams. The signals through the various networks and the signals on network link 1514 and through communication interface 1513, which carry the digital data to and from computer platform 1501, are exemplary forms of carrier waves transporting the information.

Computer platform 1501 can send messages and receive data, including program code, through the variety of network(s) including Internet 1518 and LAN 1515, network link 1514 and communication interface 1513. In the Internet example, when the system 1501 acts as a network server, it might transmit a requested code or data for an application program running on client(s) 1520 and/or 1521 through Internet 1518, gateway/firewall 1517, local area network 1515 and communication interface 1513. Similarly, it may receive code from other network resources.

The received code may be executed by processor 1505 as it is received, and/or stored in persistent or volatile storage devices 1508 and 1506, respectively, or other non-volatile storage for later execution. In this manner, computer system 1501 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, per, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with VNAS migration replication functionality. It is intended that the specification and examples be considered as exemplary only, with a true scope and spirit of the invention being indicated by the following claims.

What is claimed is:

1. A method of VNAS migration in case of a virtual network attached storage (VNAS) failure at a first VNAS located at a source network attached storage (NAS) head, the method comprising:
   detecting a failure of the first VNAS;
   selecting a target NAS head by referring to load information of a plurality of NAS heads being managed by a load balancing module at the source NAS head; and
   moving the first VNAS from the source NAS head to the target NAS head,
   wherein the source NAS head and the target NAS head are located on different NAS systems;
   wherein the detecting comprises utilizing a heart beat method.

2. The method of claim 1, wherein selecting a target NAS head includes finding a least loaded NAS head;
   wherein the first VNAS manages information of a device name, a mount point for each file system included in said first VNAS, and a network configuration information including gateways used,
   wherein the source NAS head includes logical unit information for logical units included in the first VNAS, and information on remote copy relationships between said logical units managed by the first VNAS.

3. The method of claim 2, wherein selecting a target NAS head includes designation of the target NAS head by an administrator;
- wherein moving the first VNAS from the source NAS head to the target NAS head includes sending from said source NAS head to said target NAS head said information on the remote copy relationships between said logical units managed by the first VNAS.

4. The method of claim 2, wherein moving the first VNAS from the source NAS head to the target NAS head includes:
- mounting operating system logical unit and user data logical unit of the first VNAS;
- registering the second VNAS; and
- deleting the first VNAS.

5. A method of virtual network attached storage (VNAS) migration in case of failure of a source network attached storage (NAS) head including a plurality of source VNAS, the method comprising:
- detecting a failure of the source NAS head;
- selecting one or more target NAS heads by referring to load information of NAS heads being managed by a common program; and
- moving the plurality of source VNAS from the source NAS head to the target NAS heads,
- wherein the source NAS head is located on a first NAS system and the target NAS heads are located on one or more NAS systems different from the first NAS system;
- wherein detecting a failure of the source NAS head includes utilizing a heart beat method.

6. The method of claim 5, wherein moving the plurality of source VNAS from the source NAS head to the target NAS heads includes for each source VNAS:
- creating a corresponding target VNAS at one of the target NAS heads;
- mounting associated operating system logical unit and user data logical unit of the source VNAS according to a VNAS management table at the target NAS head;
- registering the target VNAS; and
- deleting entry of the source VNAS.

7. The method of claim 5, wherein selecting one or more target NAS heads includes finding one or more least loaded NAS heads or designation of the target NAS heads by an administrator;
- wherein each of said plurality of source VNAS manages information of a device name, a mount point for each file system included in each of said plurality of source VNAS, and a network configuration information including gateways used;
- wherein the source NAS head includes logical unit information for logical units included in each of the plurality of source VNAS, and information on remote copy relationships between said logical units managed by said plurality of source VNAS;
- wherein moving the plurality of source VNAS from the source NAS head to the target NAS head includes sending, for each source VNAS, from said source NAS head to said target NAS head said information on the remote copy relationships between said logical units managed by the each source VNAS.

8. The method of claim 5, wherein the target NAS heads are located on one or more NAS systems located at physical locations different from a physical location of the first NAS system.

9. A method of virtual network attached storage (VNAS) migration from a source network attached storage (NAS) head hosting a plurality of source VNAS, the method comprising:
- detecting overloading or light loading or failure at the source NAS head;
- selecting one or more target NAS heads by referring to load information of NAS heads being managed by a common program as the source NAS head;
- moving one or more of the plurality of source VNASs from the source NAS head to the target NAS heads, and
- powering down the source NAS head;
- wherein the source NAS head is located on a first NAS system and the target NAS heads are located on one or more NAS systems different from the first NAS system.

10. The method of claim 9, wherein moving one or more of the plurality of source VNASs from the source NAS head to the target NAS heads includes, for each source VNAS:
- creating a corresponding target VNAS at one of the target NAS heads;
- mounting associated operating system logical unit and user data logical unit of the source VNAS according to a VNAS management table at the target NAS head;
- registering the target VNAS;
- deleting entry of the source VNAS; and
- notifying the target NAS head of termination of the source VNAS;
- wherein each of said plurality of source VNAS manages information of a device name, a mount point for each file system included in each of said plurality of source VNAS, and a network configuration information including gateways used;
- wherein the source NAS head includes logical unit information for logical units included in each of the plurality of source VNAS, and information on remote copy relationships between said logical units managed by said plurality of source VNAS;
- wherein moving one or more of the plurality of source VNAS from the source NAS head to the target NAS head includes sending, for each source VNAS, from said source NAS head to said target NAS head said information on the remote copy relationships between said logical units managed by the each source VNAS.

11. The method of claim 9, wherein if the source NAS head is detected as being lightly loaded or failed, moving one or more of the plurality of source VNAS from the source NAS head to the target NAS heads includes moving all of the source VNAS from the source NAS head to the target NAS heads.

12. The method of claim 9, wherein selecting one or more target NAS heads includes designation of the target NAS heads by an administrator.

13. The method of claim 9, further comprising:
- replicating the user data of the source VNAS at the target VNAS;
- determining whether the replication is synchronous or asynchronous; and
- when the replication is asynchronous, requiring synchronization of migration related logical units located in a VNAS copy table to a remote copy program associated with the target NAS head.

14. The method of claim 9, further comprising:
- determining whether system configurations of the target NAS head and the source NAS head are different;
- when the system configurations of the target NAS head and the source NAS head are different, checking system configurations of the target NAS head stored at a storage location associated with the source NAS head; and
- reading the target system configuration from the storage location at the target VNAS.

15. A system for implementing remote virtual network attached storage (VNAS) migration, the system comprising:
one or more network attached storage (NAS) systems;
one or more management computers; and
one or more networks for coupling the NAS systems together and to the one or management computers,
wherein each of the NAS systems comprises;
one or more NAS heads, each of the NAS heads being logically divided into one or more VNAS; and
a storage system coupled to the one or more NAS heads, the storage system having a storage controller coupled to disk drives, and
wherein the one or more VNAS are operable to migrate from one NAS system to another NAS system;
wherein at least one of the NAS systems is located at a physical location different from a physical location of the other NAS systems, and
wherein the networks include a wide area network.

16. The system of claim 15, wherein each of the NAS heads further includes:
a VNAS management module including a VNAS management program or sharing information with a VNAS management program of other NAS heads; and
a remote copy module for executing data copy from one NAS head to another NAS head on another NAS System.

17. The system of claim 16, wherein each of the VNAS includes:
a network file system server for communicating with a network file system client of a NAS client and processing network file system operations;
a file system management program for managing a mount table including mount point information for each of the file systems;
a network management program for managing a routing table including routing source and destination information;
a user management program; and
a device management program for managing a device table including device names and device identifications of logical units,
wherein the mount table, the device table, the routing table, the VNAS management table, and the VNAS copy table are stored in the storage system of the NAS system including the VNAS.

18. The system of claim 17, wherein the VNAS management module includes:
a VNAS assign program for managing the VNAS allocation on a NAS head and for maintaining the VNAS management table;
a failure detection program for detecting failure of a VNAS or a NAS head on the NAS system and for sending the failed VNAS to another VNAS on the same NAS head or on another NAS head or for sending the VNAS on the failed NAS head to another NAS head, the another NAS head being within a same NAS head cluster or on a different NAS system; and
a load balancing program for monitoring load of each of the NAS heads on the NAS system and attempting to locate a replacement NAS head in the same NAS head cluster or in another NAS system and for moving some or all of the VNAS of the overloaded NAS head to the replacement NAS head.

19. The system of claim 15,
wherein each of the management computers hosts:
a management software for issuing NAS management operations, and
a VNAS copy management program for maintaining a VNAS copy table, and
wherein the VNAS copy table stores relationships of source logical units and destination logical units of VNAS copies at each of the NAS heads.

20. The system of claim 15, wherein the storage system includes:
a storage control software for processing interface commands from the NAS head;
logical unit volumes each including storage space from one or more disk drives; and
a remote copy software for executing a volume copy from one storage system to another storage system on another NAS system.

* * * * *